United States Patent
Negishi et al.

(10) Patent No.: US 7,050,367 B1
(45) Date of Patent: May 23, 2006

(54) OPTICAL INFORMATION RECORDING METHOD AND APPARATUS, AND RECORDED MEDIUM WHERE OPTICAL INFORMATION RECORDING CONTROL PROGRAM IS RECORDED

(75) Inventors: Akira Negishi, Seta-gun (JP); Ryuichi Sunagawa, Takasaki (JP)

(73) Assignee: Taiyo Yuden Co., Ltd., Tokyo (JP)

(*) Notice: Subject to any disclaimer, the term of this patent is extended or adjusted under 35 U.S.C. 154(b) by 0 days.

(21) Appl. No.: 09/719,501

(22) PCT Filed: Apr. 28, 2000

(86) PCT No.: PCT/JP00/02828

§ 371 (c)(1),
(2), (4) Date: Dec. 14, 2000

(87) PCT Pub. No.: WO00/67251

PCT Pub. Date: Nov. 9, 2000

(30) Foreign Application Priority Data

Apr. 28, 1999 (JP) ............................ 11-121192

(51) Int. Cl.
G11B 7/45 (2006.01)
G11B 7/95 (2006.01)
G11B 7/125 (2006.01)

(52) U.S. Cl. ............... 369/47.1; 369/44.32; 369/53.12; 369/47.51; 369/59.11; 369/116

(58) Field of Classification Search ................ 369/116, 369/59.11, 47.51, 53.27, 53.1, 53.24, 47.53, 369/47.1, 44.32, 53.12; 713/320
See application file for complete search history.

(56) References Cited

U.S. PATENT DOCUMENTS 5,563,862 A * 10/1996 Udagawa ................ 369/53.24

(Continued)

FOREIGN PATENT DOCUMENTS

JP    4-263129    9/1992

(Continued)

OTHER PUBLICATIONS

"CD-R Kosoku Kiroku Gijutsu," Needs & Seeds, vol. 14, pp. 72-76.

(Continued)

*Primary Examiner*—William Korzuch
*Assistant Examiner*—Kim-Kwok Chu
(74) *Attorney, Agent, or Firm*—Finnegan, Henderson, Farabow, Garrett & Dunner, L.L.P.

(57) ABSTRACT

An optical information recording method and a device which can record information with a laser light irradiating direction kept constant even if an information recording surface of an optical information recording medium is inclined and, a recording medium having a program therefor recorded thereon are provided. When performing OPC, a relational expression between a recording power and asymmetry (a standard expression), a relational expression between a differential light intensity value and a recording power (a first detection expression), a relational expression between a recording power and a difference between a differential light intensity value and a reflected light amount ratio (a second detection expression), a relational expression between a reflected light amount ratio and a recording power (a third detection expression), a differential light intensity value with which optimum asymmetry can be obtained, a recording power, a reflected light amount ratio and the like are determined and stored. When information is actually recorded, the above expressions are used to correct the recording power so as to obtain optimum asymmetry at all times, whereby a decreased portion of the irradiated light amount per unit area caused with the inclination of the information recording surface can be corrected without correcting the irradiating direction of the laser light.

39 Claims, 14 Drawing Sheets

U.S. PATENT DOCUMENTS 5,898,656 A * 4/1999 Takiguchi ............... 369/47.51
6,418,102 B1 * 7/2002 Suga ...................... 369/47.53
6,646,965 B1 * 11/2003 Kim ....................... 369/47.53

FOREIGN PATENT DOCUMENTS

| JP | 8-63751 | 3/1996 |
| JP | 8-147701 | 6/1996 |
| JP | 9-270128 | 10/1997 |
| JP | 9-282663 | 10/1997 |
| JP | 10-188316 | 7/1998 |

OTHER PUBLICATIONS

"8 Bai Soku Kiroku Taio CD-R no Kaihatsu," Needs & Seeds, vol. 14, pp. 67-71.

* cited by examiner

3T RECORDING PULSE

RF SIGNAL

14T RECORDING PULSE

RF SIGNAL

14T RECORDING PULSE

RF SIGNAL ial disc (CD-R). And, the technology for recording
OPTICAL INFORMATION RECORDING METHOD AND APPARATUS, AND RECORDED MEDIUM WHERE OPTICAL INFORMATION RECORDING CONTROL PROGRAM IS RECORDED This application is a 371 of PCT/JP00/02828 Apr. 28, 2000.

TECHNICAL FIELD

The present invention relates to an optical information recording method and a device and also a recording medium on which an optical information recording control program is recorded.

BACKGROUND ART

Conventionally, there is used a technology to record a large volume of information on an optical information recording medium, e.g., an optical disc such as a write once type optical disc (CD-R). And, the technology for recording information at 2–6X speed or a faster recording speed is coming into general use in recent years.

When recording information on an optical disc, based on a digital signal of digitized information to be recorded, pulse-shaped laser light is irradiated from an optical pickup to the rotating optical disc to form pits.

For example, to form pits on the optical disc by using the digital signal of the digitized information to be recorded, the intensity of laser light irradiated to the optical disc during a high-level period of the digital signal is controlled to be high to change the state of a recording layer by the laser light energy so to form the pits. And, the laser light having a low light intensity needed for tracking is irradiated during a low-level period.

The optical disc might have an inclined information recording surface due to warp or deformation of the disc. Mostly, the inclination of the information recording surface is not uniform and becomes large gradually from the inner circumference toward the outer circumference of the optical disc. Inclination angle θ of the information recording surface to a plane surface orthogonal to the rotation axis of the optical disc is generally called the tilt angle.

When the information recording surface is not inclined, the laser light is irradiated substantially vertically from the optical pickup to the information recording surface to form the pits.

But, when the direction that the laser light is emitted is fixed and if the information recording surface is inclined, a spot of the laser light is distorted, so that a light amount irradiated per unit area of the information recording surface decreases. Therefore, the pit size becomes small, and jitter becomes worse when the information is reproduced.

Therefore, there is adopted tilt servo control which detects the inclination (tilt angle) of the information recording surface of the optical disc and tilts the optical pickup according to the tilt angle so to control the direction to emit the laser light to be perpendicular to the information recording surface of the optical disc.

In addition to the above tilt servo control, servo control such as focusing control of the laser light spot and tracking control so to make the laser light spot follow grooves is performed to form optimum pits.

However, the mechanism to incline the optical pickup according to the tilt angle θ is complex, and the device costs a great deal.

A method for appropriate recording (appropriate β) without using a tilt correction mechanism is disclosed in "Power calibration method for optical disc recording/reproducing device" (Japanese Patent Application Laid-Open Publication No. 8-147701). It is suggested to make the optimization of recording laser light intensity on the outer circumference (hereinafter called OPC: Optimum Power Control), but OPC takes time.

The aforesaid β means asymmetry, which is expressed by the following expression (A) or (B).

$$\beta=(A1+A2)/(A1-A2) \quad (A)$$

$$\beta=[(I14H+I14L)-(I3H+I3L)]/[2(I14H-I14L)] \quad (B)$$

where, A1 means a top level value of a pulse having length 11T of CD-R and A2 means a bottom level value of a pulse having length 11T.

And, I14H means a top level value of a pulse having length 14T of DVD-R, I14L means a bottom level value of the pulse having length 14T, I3H means a top level value of a pulse having length 3T, and I3L means a bottom level value of the pulse having length 3T.

DISCLOSURE OF THE INVENTION

It is an object of the present invention to provide an optical information recording method and device which can record information on an information recording surface of an optical information recording medium with a direction of irradiating laser light kept stable even if an inclination or the like is caused in the information recording surface.

It is also an object of the present invention to provide a recording medium having an optical information recording control program recorded thereon so that information can be recorded on the information recording surface of an optical information recording medium with a direction to irradiate the laser light kept uniform even if information recording surface is inclined.

The optical information recording method of the present invention is an optical information recording method which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the method comprising the steps of:

changing sequentially a recording power of laser light to be irradiated to the optical information recording medium to record on the optical information recording medium before actual recording of information and also detecting asymmetry for every recording power to determine a first relation between the asymmetry and the recording power;

fixing the recording power to a predetermined recording power and sequentially changing a spatial positional relation of the laser light to the optical information recording medium to record on the optical information recording medium and also detecting a reflected light amount ratio related to the asymmetry and pits having different lengths for every spatial positional relation to determine a second relation between the asymmetry and the reflected light amount ratio;

determining a third relation between the recording power and the reflected light amount ratio according to the first relation and the second relation and also determining an optimum reflected light amount ratio corresponding to an optimum recording power; and detecting the reflected light amount ratio at the time of actual recording of information to determine a recording power corresponding to the detected reflected light amount ratio according to the third relation, and correcting the recording power so that a difference between the detected reflected light amount ratio and the optimum reflected light amount ratio becomes zero.

Here, the recording, which is performed before actual recording of information, means so-called try writing related to OPC. This try writing is made in two steps in the present invention. First try writing makes try writing with the recording power of laser light sequentially changed to determine a first relation between the asymmetry and the recording power. And, second try writing makes try writing with the spatial positional relation of the laser light to the optical information recording medium sequentially changed to determine a second relation between the asymmetry and the reflected light amount ratio. A third relation between the recording power and the reflected light amount ratio is determined from the first relation determined by the first try writing and the second relation determined by the second try writing. Thus, the recording power according to the reflected light amount ratio is corrected when actual recording is made so to enable optimum correction of the inclination or the like caused on the information recording surface of the optical information recording medium.

The recording power can be changed sequentially by controlling a laser control section to change the laser power in predetermined steps. And, the spatial positional relation can be changed sequentially by changing at least one servo based offset among focusing, tracking and tilting of the optical information recording device in predetermined steps.

For example, the reflected light amount ratio is detected as a ratio of a total reflected light amount from a pit smaller than a spot diameter of the laser light spot to a total reflected light amount from a pit larger than the above spot diameter. This reflected light amount ratio includes information about the inclination or the like caused on the information recording surface of the optical information recording medium. By using this reflected light amount ratio, optimum correction can be made by merely controlling the recording power even if the inclination or the like is caused on the information recording surface of the optical information recording medium.

The asymmetry means a value calculated by the aforesaid expression (A) or (B).

The optical information recording method of the present invention is also an optical information recording method which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the method comprising the steps of:

performing first recording to record test data on the optical information recording medium by sequentially changing a recording power of the laser light irradiated to the optical information recording medium at the time of a recording laser light intensity optimization processing before actual recording of information;

performing second recording to record test data on the optical information recording medium by sequentially changing a spatial positional relation of the laser light to the optical information recording medium with the recording power fixed;

detecting, at the time of the first recording, the recording power and first information mainly depending on the recording power for every recording power, and asymmetry and second information depending on the spatial positional relation, and storing a first relation with the first information to the recording power, a second relation with the second information to the recording power and a relation with the recording power to the asymmetry;

determining and storing an optimum recording power by which an optimum asymmetry is obtained from the relation with the recording power to the asymmetry, and storing optimum first information and optimum second information corresponding to the optimum recording power from the first relation and the second relation;

detecting, at the time of the second recording, asymmetry and third information mainly depending on the spatial positional relation and storing a relation with the third information to the asymmetry;

determining and storing a third relation with the third information to the recording power from the relation with the recording power to the asymmetry stored at the time of the first recording and the relation of the second information to the asymmetry stored at the time of the second recording, and storing optimum third information corresponding to the optimum recording power from the third relation;

detecting the first information, the second information and the third information at the time of actual recording of information;

determining a first difference between the detected first information and the optimum first information, a second difference between the detected second information and the optimum second information and a third difference between the detected third information and the optimum third information;

when the third difference is zero and the first difference is not zero, determining a recording power according to the detected first information and the first relation, and correcting the recording power so that the first difference becomes zero;

when the third difference is not zero and the first difference is zero, determining a recording power according to the detected third information and the third relation, and correcting the recording power so that the third difference becomes zero; and when the third difference is not zero, the first difference is not zero and the second difference is not zero, determining a recording power according to the detected second information and the second relation, and correcting the recording power so that the second difference becomes zero.

According to the above aspect of the invention, the two try writings including the first try writing to sequentially change the recording power of the laser light and the second try writing to sequentially change the spatial positional relation of the laser light to the optical information recording medium are also performed.

In the invention, however, in addition to the correction of the recording power to deal with the inclination or the like caused in the information recording surface of the optical information recording medium, the recording power is also corrected so to optimize a reproducing signal which does not depend on the inclination or the like caused in the information recording surface of the optical information recording medium.

Specifically, according to the present invention, the first try writing detects the first information mainly depending on the recording power, the second information depending on the recording power and the spatial positional relation and the asymmetry, and the second try writing detects the third information mainly depending on the spatial positional relation and the asymmetry. The first try writing determines the optimum recording power from the relation of the recording power with the asymmetry, and stores the optimum first information and the optimum second information corresponding to the optimum recording power in view of the first relation of the first information with the recording power and the second relation of the second information with the recording power. The second try writing determines and stores the third relation of the third information with the recording power in view of the relation of the recording power with the asymmetry determined by the first try writing and the relation of the second information with the asymmetry determined by the second try writing and stores the optimum third information corresponding to the optimum recording power in view of the third relation.

When information is actually recorded, the first information, the second information and the third information are detected, and if the third difference between the third information and the optimum third information is zero and the first difference between the first information and the optimum first information is not zero, it is judged that the recording power mainly depending on the recording power must be corrected. Then, the recording power is determined according to the detected first information and first relation, and the recording power is corrected so that the first difference becomes zero.

When the third difference is not zero and the first difference is zero, it is judged that the recording power to deal with the inclination or the like caused in the information recording surface of the optical information recording medium must be corrected. Then, the recording power is determined according to the detected third information and third relation, and the recording power is corrected so that the third difference becomes zero.

When the third difference is not zero, the first difference is not zero and the second difference is not zero, it is judged that the recording power mainly depending on the recording power and the recording power to deal with the inclination or the like caused in the information recording surface of the optical information recording medium must be corrected. Then, the recording power is determined according to the detected second information and second relation, and the recording power is corrected so that the second difference becomes zero.

For example, the first information can be a differential light intensity value which comprises a difference between a maximum value of the reflected light intensity at the front end and an average value of the reflected light intensity at the rear end of a pit larger than the spot diameter of the laser light spot, and the second information can be a difference detection value which comprises a difference between the differential light intensity value and the reflected light amount ratio. And, the third information can be, for example, the reflected light amount ratio.

The optical information recording method of the present invention is also an optical information recording method which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the method comprising:

a first step of recording test data on the optical information recording medium by sequentially changing a recording power of the laser light irradiated to the optical information recording medium at the time of processing to optimize recording laser light intensity before actual recording of information;

a second step of detecting, in the first step, a differential light intensity value which is a difference between a maximum value of reflected light intensity at a front end and an average value of the reflected light intensity at a rear end of a pit larger than the spot diameter of the laser light spot, a reflected light amount ratio which is a ratio of a total reflected light amount from a pit smaller than the spot diameter to a total reflected light amount from the pit larger than the spot diameter and asymmetry in correspondence with the recording power, and calculating a difference between the differential light intensity value and the reflected light amount ratio as a difference detection value;

a third step of determining and storing a first detection expression which indicates a relation between the recording power and the differential light intensity value according to the differential light intensity value detected in the second step;

a fourth step of determining and storing a second detection expression which indicates a relation between the recording power and the difference detection value according to the difference detection value calculated in the second step;

a fifth step of determining and storing a standard expression which indicates a relation between the asymmetry and the recording power according to the asymmetry detected in the second step;

a sixth step of determining and storing an optimum recording power which enables to obtain optimum asymmetry according to the standard expression stored in the fifth step;

a seventh step of storing as an optimum differential light intensity value a differential light intensity value corresponding to the optimum recording power according to the optimum recording power determined in the sixth step and the first detection expression;

an eighth step of storing as an optimum standardized difference detection value a difference detection value corresponding to the optimum recording power according to the optimum recording power determined in the sixth step and the second detection expression;

a ninth step of recording test data on the optical information recording medium by sequentially changing at least one servo based offset among focusing, tilting and tracking of an optical pickup for irradiating the laser light to the optical information recording medium in a predetermined step with the recording power fixed to the optimum recording power determined in the sixth step;

a tenth step of detecting, in the ninth step, the reflected light amount ratio and the asymmetry for every offset;

an eleventh step of determining a relational expression of a reflected light amount ratio to the asymmetry according to the reflected light amount ratio and the asymmetry detected in the tenth step;

a twelfth step of determining and storing a third detection expression indicating a relation between the recording power and the reflected light amount ratio according to the relational expression determined in the eleventh step and the standard expression determined in the fifth step;

a thirteenth step of storing as an optimum reflected light amount ratio a reflected light amount ratio corresponding to the optimum recording power according to the optimum recording power determined in the sixth step and the third detection expression;

a fourteenth step of detecting the differential light intensity value and the reflected light amount ratio and calculating a difference detection value when actually recording information;

a fifteenth step of calculating a first difference between the differential light intensity value detected in the fourteenth step and the optimum differential light intensity value;

a sixteenth step of calculating a second difference between the difference detection value calculated in the fourteenth step and the optimum standardized difference detection value;

a seventeenth step of calculating a third difference between the reflected light amount ratio detected in the fourteenth step and the optimum reflected light amount ratio;

an eighteenth step of determining a recording power according to the first detection expression and the differential light intensity value detected in the fourteenth step when the third difference is zero and the first difference is not zero and correcting the recording power so that the first difference becomes zero;

a nineteenth step of determining a recording power according to the third detection expression and the reflected light amount ratio detected in the fourteenth step when the third difference is not zero and the first difference is zero and correcting the recording power so that the third difference becomes zero; and a twentieth step of determining a recording power according to the second detection expression and the difference detection value calculated in the fourteenth step when the third difference is not zero, the first difference is not zero and the second difference is not zero and correcting the recording power so that the second difference becomes zero.

The above first detection expression to the third detection expression can be configured of a linear function.

The optical information recording device of the present invention is also an optical information recording device which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the device comprising:

an optical pickup which irradiates laser light to the optical information recording medium and receives reflected light from the optical information recording medium to output a light receiving signal;

laser control means which controls a recording power of the laser light output from the optical pickup;

servo-control means which controls at least one of focusing, tracking and tilting of the optical pickup;

reflected light amount ratio detecting means which detects, as a reflected light amount ratio, a ratio of a total reflected light amount from a pit smaller than the spot diameter to a total reflected light amount from a pit larger than the spot diameter of the laser light spot according to the light receiving signal output from the optical pickup;

asymmetry detecting means which detects asymmetry of the light receiving signal according to the light receiving signal output from the optical pickup;

first control means which performs first recording on the optical information recording medium by sequentially changing the recording power of the laser light irradiated to the optical information recording medium by controlling the laser control means and the servo-control means before actual recording of information, determines a first relation between the asymmetry and the recording power by detecting the asymmetry from the asymmetry detecting means for every recording power, performs second recording on the optical information recording medium by sequentially changing at least one offset among focusing, tilting and tracking of the optical pickup with the recording power fixed at a predetermined recording power in predetermined steps, determines a second relation between the asymmetry and the reflected light amount ratio by detecting asymmetry from the asymmetry detecting means and a reflected light amount ratio from the reflected light amount ratio detecting means for every offset, determines a third relation between the recording power and the reflected light amount ratio according to the first relation and the second relation, and determines an optimum reflected light amount ratio corresponding to the optimum recording power; and second control means which determines a recording power corresponding to the detected reflected light amount ratio according to the third relation by detecting a reflected light amount ratio from the reflected light amount ratio detecting means at actual recording of the information and corrects the recording power so that the difference between the detected reflected light amount ratio and the optimum reflected light amount ratio becomes zero.

The above configuration enables optimum correction to deal with the inclination or the like caused in the information recording surface of the optical information recording medium.

The optical information recording device of the present invention is an optical information recording device which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the device-comprising:

an optical pickup which irradiates laser light to the optical information recording medium and receives reflected light from the optical information recording medium to output a light receiving signal;

laser control means which controls the recording power of the laser light output from the optical pickup;

servo-control means which controls a spatial positional relation of the laser light to the optical information recording medium;

information detecting means which detects, according to the light receiving signal output from the optical pickup, first information mainly depending on the recording power, second information depending on the recording power and the spatial positional relation and third information mainly depending on the spatial positional relation;

asymmetry detecting means which detects asymmetry of the light receiving signal according to the light receiving signal output from the optical pickup; and control means, wherein the control means comprises:

first recording control means which performs first recording to record test data on the optical information recording medium by sequentially changing the recording power of the laser light irradiated to the optical information recording medium by controlling the laser control means at the time of a recording laser light intensity optimization processing before information is actually recorded;

second recording control means which performs second recording to record test data on the optical information recording medium by sequentially changing a spatial positional relation of the laser light to the optical information recording medium with the recording power fixed by controlling the laser control means and the servo-control means;

first storing means which stores a first relation of the first information with the recording power, a second relation of the second information with the recording power and a relation of the recording power with the asymmetry by obtaining the first information and the second information according to the output of the information detecting means for every recording power at the first recording and obtaining asymmetry according to the output of the asymmetry detecting means;

second storing means which determines and stores optimum recording power with which optimum asymmetry can be obtained from the relation of the recording power with the asymmetry and stores optimum first information and optimum second information corresponding to the optimum recording power from the first relation and the second relation;

third storing means which store a relation of the third information with the asymmetry by obtaining the third information according to the output of the information detecting means at the time of the second recording and also obtaining asymmetry according to the output of the asymmetry detecting means;

fourth storing means which determines and stores a third relation of the third information with the recording power from the relation of the recording power with the asymmetry stored at the time of the first recording and the relation of the second information with the asymmetry stored at the time of the second recording and stores optimum third information corresponding to the optimum recording power from the third relation; and correcting means which detects the first information, the second information and the third information according to the output of the information detecting means at actual recording of the information, determines a first difference between the detected first information and the optimum first information, a second difference between the second information and the optimum second information and a third difference between the third information and the optimum third information, and when the third difference is zero and the first difference is not zero, determines a recording power according to the detected first information and the first relation, corrects the recording power so that the first difference becomes zero, and when the third difference is not zero and the first difference is zero, determines a recording power according to the detected third information and the third relation, corrects the recording power so that the third difference becomes zero, and when the third difference is not zero, the first difference is not zero and the second difference is not zero, determines a recording power according to the detected second information and the second relation, and corrects the recording power so that the second difference becomes zero.

The optical information recording device of the present invention is also an optical information recording device which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the device comprising:

an optical pickup which irradiates laser light to the optical information recording medium and receives reflected light from the optical information recording medium to output a light receiving signal;

laser control means which controls a recording power of the laser light output from the optical pickup;

servo-control means which controls at least one of focusing, tracking and tilting of the optical pickup;

differential light intensity value detecting means which detects a differential light intensity value which is a difference between a maximum value of the reflected light intensity at a front end and an average value of the reflected light intensity at a rear end of a pit larger than the spot diameter of the laser light spot;

reflected light amount ratio detecting means which detects as a reflected light amount ratio a ratio of a total reflected light amount from a pit smaller than the spot diameter to a total reflected light amount from a pit larger than the spot diameter of the laser light spot according to the light receiving signal output from the optical pickup;

asymmetry detecting means which detects asymmetry of the light receiving signal according to the light receiving signal output from the optical pickup; and control means, wherein the control means comprises:

first recording control means which records test data on the optical information recording medium by sequentially changing the recording power of the laser light irradiated to the optical information recording medium by controlling the laser control means at the time of a recording laser light intensity optimizing processing before actual recording of information;

first obtaining means which obtains, according to the recording power when recording by the first recording control means, the differential light intensity value from the differential light intensity value detecting means, the reflected light amount ratio from the reflected light amount ratio detecting means, and asymmetry as a difference detection value from the asymmetry detecting means, and calculates as a differential detection value a difference between the differential light intensity value and the reflected light amount ratio;

first processing means which determines to store a first detection expression indicating a relation between the recording power and the differential light intensity value according to the differential light intensity value obtained by the first obtaining means;

second processing means which determines to store a second detection expression indicating a relation between the recording power and the difference detection value according to the difference detection value calculated by the first obtaining means;

third processing means which determines to store a standard expression indicating a relation between the asymmetry and the recording power according to the asymmetry obtained by the first obtaining means;

fourth processing means which determines to store optimum recording power with which optimum asymmetry can be obtained according to the standard expression stored by the third processing means;

fifth processing means which stores as an optimum differential light intensity value a differential light intensity value corresponding to the optimum recording power according to the first detection expression and the optimum recording power determined by the fourth processing means;

sixth processing means which stores as an optimum standardized difference detection value the difference detection value corresponding to the optimum recording power according to the second detection expression and the optimum recording power determined by the fourth processing means;

second recording control means which controls the laser control means and the servo control means to fix the recording power to the optimum recording power determined by the fourth processing means and sequentially changes at least one servo based offset among focusing, tilting and tracking of the optical pickup for irradiating the laser light to the optical information recording medium in predetermined steps so to record test data on the optical information recording medium;

second obtaining means which obtains, when recording by the second recording control means, the reflected light amount ratio from the reflected light amount ratio detecting means for the every offset and also obtains asymmetry from the asymmetry detecting means;

seventh processing means which determines a relational expression of the reflected light amount ratio to the asymmetry according to the reflected light amount ratio and the symmetry obtained by the second obtaining means;

eighth processing means which determines to store a third detection expression indicating a relation between the recording power and the reflected light amount ratio according to the relational expression determined by the seventh processing means and the standard expression determined by the third processing means;

ninth processing means which stores as an optimum reflected light amount ratio the reflected light amount ratio corresponding to the optimum recording power according to the optimum recording power determined by the fourth processing means and the third detection expression;

third obtaining means which, when actually recording information, obtains the differential light intensity value from the differential light intensity value detecting means, obtains the reflected light amount ratio from the reflected light amount ratio detecting means, and calculates a difference between the differential light intensity value and the reflected light amount ratio as a difference detection value;

tenth processing means which calculates a first difference between the optimum differential light intensity value and the differential light intensity value obtained by the third obtaining means;

eleventh processing means which calculates a second difference between the optimum standardized difference detection value and the difference detection value calculated by the third obtaining means;

twelfth means which calculates a third difference between the optimum reflected light amount ratio and the reflected light amount ratio obtained by the third obtaining means;

first correcting means which determines a recording power according to the first detection expression and the differential light intensity value obtained by the third obtaining means when the third difference is zero and the first difference is not zero, and corrects the recording power so that the first difference becomes zero;

second correcting means which determines a recording power according to the third detection expression and the reflected light amount ratio obtained by the third obtaining means when the third difference is not zero and the first difference is zero, and corrects the recording power so that the third difference becomes zero; and third correcting means which determines a recording power according to the second detection expression and the difference detection value calculated by the third obtaining means when the third difference is not zero, the first difference is not zero and the second difference is not zero, and corrects the recording power so that the second difference becomes zero.

The recording medium on which an optical information recording control program of the present invention is recorded is a recording medium having recorded thereon an optical information recording control program to be processed by a computer which irradiates a laser light spot having a predetermined diameter to an optical information recording medium according .to a digital signal comprising a first level indicating a pit forming period and a second level indicating a pit non-forming period to form a pit having a length corresponding to the pit forming period on the optical information recording medium, wherein the optical information recording control program:

before actual recording of information, sequentially changes a recording power of laser light to be irradiated to the optical information recording medium to record on the optical information recording medium and detects asymmetry for every recording power to determine a first relation between the asymmetry and the recording power;

fixes the recording power to a predetermined recording power and sequentially changes a spatial positional relation of the laser light to the optical information recording medium to record on the optical information recording medium, and detects a reflected light amount ratio related to the asymmetry and pits having a different length for the every spatial positional relation to determine a second relation between the asymmetry and the reflected light amount ratio;

determines a third relation between the recording power and the reflected light amount ratio according to the first relation and the second relation and determines an optimum reflected light amount ratio corresponding to an optimum recording power; and determines a recording power corresponding to the detected reflected light amount ratio according to the third relation by detecting the reflected light amount ratio at the time of actual recording of information, and corrects the recording power so that a difference between the detected reflected light amount ratio and the optimum reflected light amount ratio becomes zero.

The recording medium on which an optical information recording control program of the present invention is recorded is also a recording medium having recorded thereon an optical information recording control program which is processed by a computer to irradiate a laser light spot having a predetermined diameter to an optical information recording medium according to a digital signal comprising a first level indicating a pit forming period and a second level indicating a pit non-forming period to form a pit having a length corresponding to the pit forming period on the optical information recording medium, wherein the optical information recording control program:

performs first recording to record test data on the optical information recording medium by sequentially changing a recording power of the laser light irradiated to the optical information recording medium at the time of optimizing recording laser light intensity before actual recording of information;

performs second recording to record test data on the optical information recording medium by sequentially changing a spatial positional relation of the laser light to the optical information recording medium with the recording power fixed;

detects first information mainly depending on the recording power for the every recording power, second information depending on the recording power and the spatial positional relation and asymmetry at the time of the first recording, and stores a first relation of the first information with the recording power, a second relation of the second information with the recording power and a relation of the recording power with the asymmetry;

determines to store an optimum recording power enabling to obtain optimum asymmetry in view of the relation with the recording power to the asymmetry, and stores optimum first information and optimum second information corresponding to the optimum recording power in view of the first relation and the second relation;

detects third information mainly depending on the spatial positional relation and asymmetry at the time of the second recording, and stores a relation of the third information with the asymmetry;

determines to store a third relation of the third information with the recording power in view of the relation of the recording power with the asymmetry stored at the time of the first recording and the relation of the second information with the asymmetry stored at the time of the second recording, and stores optimum third information corresponding to the optimum recording power in view of the third relation;

detects the first information, the second information and the third information at the time of actual recording of information;

determines a first difference between the detected first information and the optimum first information, a second difference between the second information and the optimum second information and a third difference between the third information and the optimum third information;

determines a recording power according to the detected first information and the first relation when the third difference is zero and the first difference is not zero, and corrects the recording power so that the first difference becomes zero;

determines a recording power according to the detected third information and the third relation when the third difference is not zero and the first difference is zero, and corrects the recording power so that the third difference becomes zero; and determines a recording power according to the detected second information and the second relation when the third difference is not zero, the first difference is not zero and the second difference is not zero, and corrects the recording power so that the second difference becomes zero.

The recording medium on which an optical information recording control program of the present invention is recorded is also a recording medium having recorded thereon an optical information recording control program which is processed by a computer to irradiate a laser light spot having a predetermined diameter to an optical information recording medium according to a digital signal comprising a first level indicating a pit forming period and a second level indicating a pit non-forming period to form a pit having a length corresponding to the pit forming period on the optical information recording medium, wherein the optical information recording control program comprises:

a first step of recording test data on the optical information recording medium by sequentially changing a recording power of the laser light irradiated to the optical information recording medium at the time of optimizing recording laser light intensity before actual recording of information;

a second step of detecting in correspondence with the recording power, during the first step, a differential light intensity value which is a difference between a maximum value of reflected light intensity at a front end and an average value of reflected light intensity at a rear end of a pit larger than the spot diameter of the laser light spot, a reflected light amount ratio which is a ratio of a total reflected light amount from a pit smaller than the spot diameter to a total reflected light amount from the pit larger than the spot diameter and asymmetry, and calculating a difference between the differential light intensity value and the reflected light amount ratio as a difference detection value;

a third step of determining and storing a first detection expression which indicates a relation between the recording power and the differential light intensity value according to the differential light intensity value detected in the second step;

a fourth step of determining and storing a second detection expression which indicates a relation between the recording power and the difference detection value according to the difference detection value calculated in the second step;

a fifth step of determining and storing a standard expression which indicates a relation between the asymmetry and the recording power according to the asymmetry detected in the second step;

a sixth step of determining and storing an optimum recording power which can obtain optimum asymmetry according to the standard expression stored in the fifth step;

a seventh step of storing as an optimum differential light intensity value a differential light intensity value corresponding to the optimum recording power according to the optimum recording power determined in the sixth step and the first detection expression;

an eighth step of storing as an optimum standardized difference detection value a difference detection value corresponding to the optimum recording power according to the optimum recording power determined in the sixth step and the second detection expression;

a ninth step of recording test data on the optical information recording medium by sequentially changing at least one servo based offset among focusing, tilting and tracking of an optical pickup for irradiating the laser light to the optical information recording medium in a predetermined step with the recording power fixed to the optimum recording power determined in the sixth step;

a tenth step of detecting, during the ninth step, the reflected light amount ratio and asymmetry for every offset;

an eleventh step of determining a relational expression of a reflected light amount ratio to the asymmetry according to the reflected light amount ratio and asymmetry detected in the tenth step;

a twelfth step of determining and storing a third detection expression indicating a relation between the recording power and the reflected light amount ratio according to the relational expression determined in the eleventh step and the standard expression determined in the fifth step;

a thirteenth step of storing as an optimum reflected light amount ratio a reflected light amount ratio corresponding to the optimum recording power according to the optimum recording power determined in the sixth step and the third detection expression;

a fourteenth step of detecting the differential light intensity value and the reflected light amount ratio and to calculate a difference detection value when information is actually recorded;

a fifteenth step of calculating a first difference between the differential light intensity value detected in the fourteenth step and the optimum differential light intensity value;

a sixteenth step of calculating a second difference between the difference detection value calculated in the fourteenth step and the optimum standardized difference detection value;

a seventeenth step of calculating a third difference between the reflected light amount ratio detected in the fourteenth step and the optimum reflected light amount ratio;

an eighteenth step of determining a recording power according to the first detection expression and the differential light intensity value detected in the fourteenth step when the third difference is zero and the first difference is not zero and to correct the recording power so that the first difference becomes zero;

a nineteenth step of determining a recording power according to the third detection expression and the reflected light amount ratio detected in the fourteenth step when the third difference is not zero and the first difference is zero and to correct the recording power so that the third difference becomes zero; and a twentieth step of determining a recording power according to the second detection expression and the difference detection value calculated in the fourteenth step when the third difference is not zero, the first difference is not zero and the second difference is not zero and to correct the recording power so that the second difference becomes zero.

BEST MODE FOR CARRYING OUT THE INVENTION

One embodiment of the present invention will be described with reference to the accompanying drawings.

Figure 1:
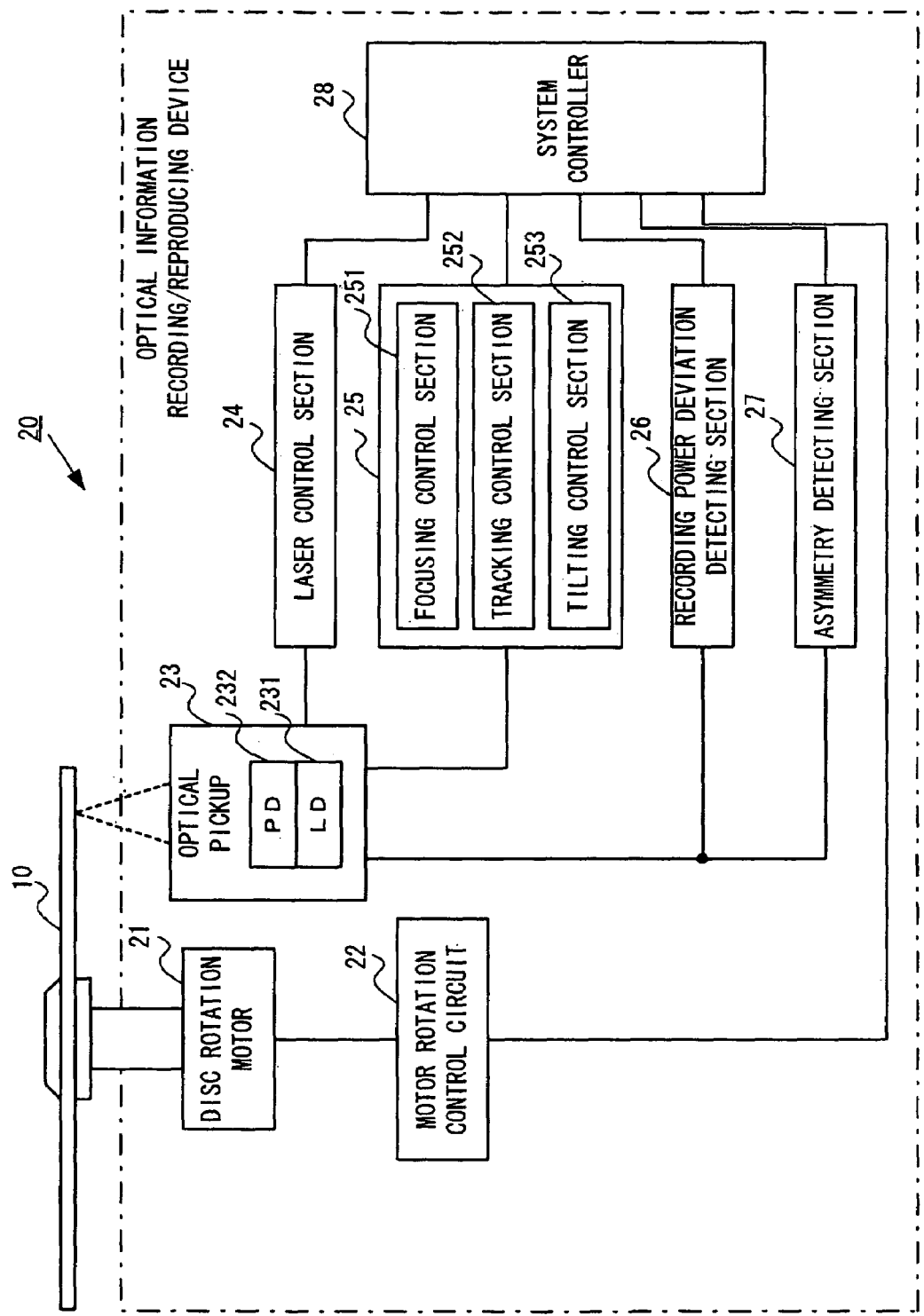
FIG. 1 is a block diagram showing an electric circuit of the optical information recording device according to one embodiment of the present invention.

FIG. 1 is a block diagram showing a main electric circuit of the optical information recording device according to one embodiment of the present invention. This embodiment describes a structure of the device for a known DVD-R as a write once type optical information recording medium. The device for CD-R which is also known as a write once type optical disc has almost the same structure.

In FIG. 1, 10 is a write once type optical disc, and 20 is an optical information recording device.

The optical information recording device 20 has disc rotation motor 21, motor drive control circuit 22, optical pickup 23, laser control section 24, servo control section 25, recording power deviation detection section 26, asymmetry detection section 27, system controller 28 and the like.

The optical disc 10 has grooves previously formed on its recording area (recording track). A disc rotation control signal and the like can be extracted from lands and pits formed on undulations of the grooves or the groove side.

The disc rotation motor 21 is driven to rotate at a given number of rotations by a drive voltage supplied from the motor drive control circuit 22.

The motor drive control circuit 22 supplies a drive voltage to the disc rotation motor 21 according to an instruction signal entered from the system controller 28.

The optical pickup 23 has laser diode (LD) 231, known four-split photodetector (PD) 232, unshown objective lens actuator and the like. Besides, the optical pickup 23 is designed to be movable in a radial direction of the optical disc 10 by means of a pickup advancing mechanism according to, for example, a known linear motor system.

The laser control section 24 enters a digital signal corresponding to information to be recorded and generates a light pulse from the digital signal according to strategy setting information designated from the system controller 28. And, a drive current having intensity corresponding to the laser light intensity designated from the system controller 28 in synchronization with the light pulse is supplied to the laser diode 231. Thus, the laser diode 231 emits the laser light having the intensity designated by the system controller 28.

The servo control section 25 comprises focus control section 251, tracking control section 252 and tilt control section 253. According to an instruction from the system controller 28, the operations of the objective lens actuator of the optical pickup 23 and the pickup advancing mechanism are controlled.

Figure 2:
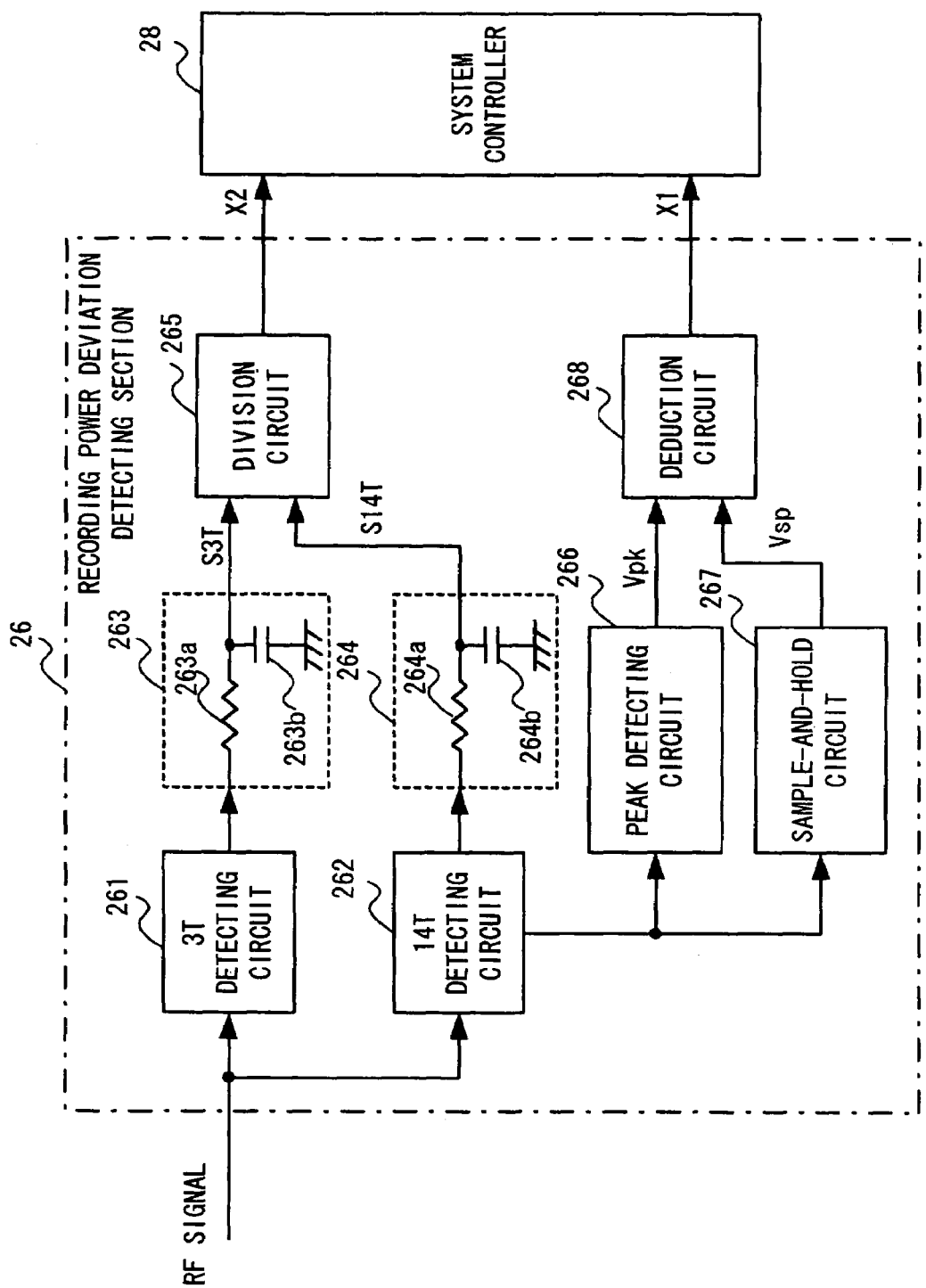
FIG. 2 is a block diagram showing an electric circuit of a recording power deviation detection section of the optical information recording device according to the embodiment of the present invention.

The recording power deviation detection section 26 comprises 3T detecting circuit 261, 14T detecting circuit 262, reflected light amount detecting circuits 263, 264, division circuit 265, peak detecting circuit 266, sample-and-hold circuit 267 and subtraction circuit 268 as shown in FIG. 2.

It is known that DVD-R records information by forming pits having lengths 3T to 11T and 14T on the recording layer of the medium.

Therefore, the recording power deviation detecting circuit 26 of this embodiment detects a reflected light amount ratio (X2) and a differential light intensity value (X1) by using a pit having length 3T (hereinafter called the 3T pit) smaller than the spot diameter of the laser light irradiated to the optical disc 10 and a pit having length 14T (hereinafter called the 14T pit) larger than the spot diameter.

The reflected light amount ratio (X2) is a ratio of total reflected light amount S3T from the 3T pit to total reflected light amount S14T from the 14T pit at the time of recording.

And, the differential light intensity value (X1) is a light intensity value for a difference between peak value Vpk at the front end of the pit of the RF signal corresponding to the 14T pit and average value Vsp at the rear portion excluding the front end at the time of recording.

In FIG. 2, the 3T detecting circuit 261 enters the RF signal output from the optical pickup 23 and outputs only the reflected light current from the 3T pit at the time of recording of information. The reflected light current from the 3T pit is charged into capacitor 263*b* through resistor 263*a* of the reflected light amount detecting circuit 263. Thus, a charging voltage of the capacitor 263*b* has a value corresponding to the total reflected light amount from the 3T pit, and a voltage corresponding to the value of the total reflected light amount S3T from the 3T pit is output from the reflected light amount detecting circuit 263.

The 14T detecting circuit 261 enters the RF signal which is output from the optical pickup 23 and outputs only the reflected light current from the 14T pit at the time of recording of information. The reflected light current from the 14T pit is charged into capacitor 264*b* through resistor 264*a* of the reflected light amount detecting circuit 264. Thus, the charged voltage to the capacitor 264*b* has a value corresponding to the total reflected light amount from the 14T pit, and a voltage corresponding to the value of the total reflected light amount S14T from the 14T pit is output from the reflected light amount detecting circuit 264.

And, the voltage output from the reflected light amount detecting circuit 263 and the voltage output from the reflected light amount detecting circuit 264 are divided by the division circuit 265 and output as the reflected light amount ratio (X2) to the system controller 28.

The peak detecting circuit 265 detects peak value Vpk of the reflected light current from the 14T pit at the front end of the pit according to the output of the 14T detecting circuit 261, and the sample-and-hold circuit 266 detects average value Vsp of the reflected light current at the rear of the 14T pit according to the output of the 14T detecting circuit 261.

And, the subtraction circuit 267 calculates a difference between the peak value Vpk at the front end of the pit of the reflected light current from the 14T pit detected by the peak detecting circuit 265 and the average value Vsp of the reflected light current at the rear of the 14T pit detected by the sample-and-hold circuit 266, and outputs it as differential light intensity value (X1) to the system controller 28.

The asymmetry detection section 27 detects asymmetry from the RF signal output from the optical pickup 23. The detected result is output to the system controller 28.

The system controller 28 comprises a known CPU and the like and records information by outputting a control instruction to the laser control section 24, the servo control section 25 and the like according to the output signals of the recording power deviation detection section 26 and the asymmetry detection section 27.

At this time, calculation to be described afterward is made, and information is recorded while the laser light intensity is corrected in real time. The laser light intensity at the time of recording (recording laser light intensity) is simply called the recording power.

Here, the reflected light amount ratio (X2) and the differential light intensity value (X1) will be described in detail.

The reflected light amount ratio (X2) is a ratio of the total reflected light amount S3T from, the 3T pit to the total reflected light amount S14T from the 14T pit at the time of recording.

Figure 3:
FIGS. 3(a) to 3(d) are diagrams illustrating a reflected light amount ratio according to the embodiment of the present invention.
Figure 3:
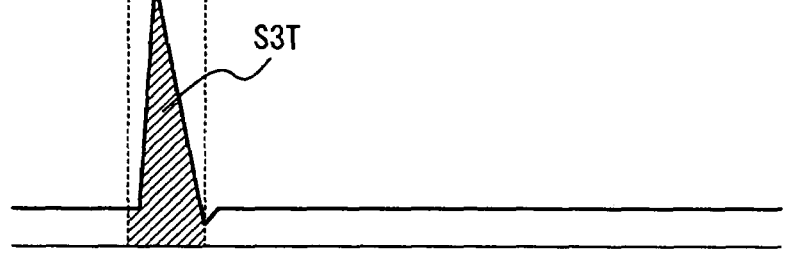
Figure 3:
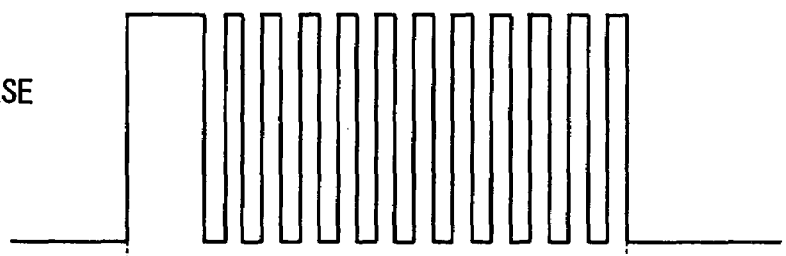
Figure 3:
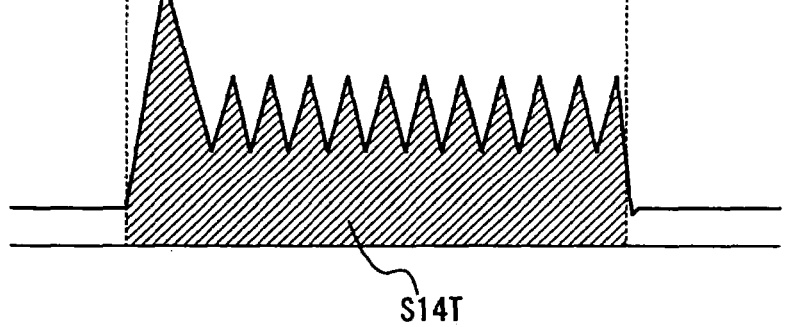
Figure 4:
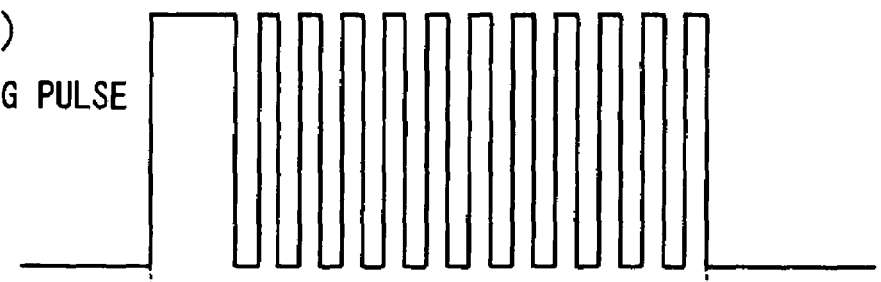
FIGS. 4(a) and 4(b) are diagrams illustrating a differential light intensity value according to the embodiment of the present invention.
Figure 4:
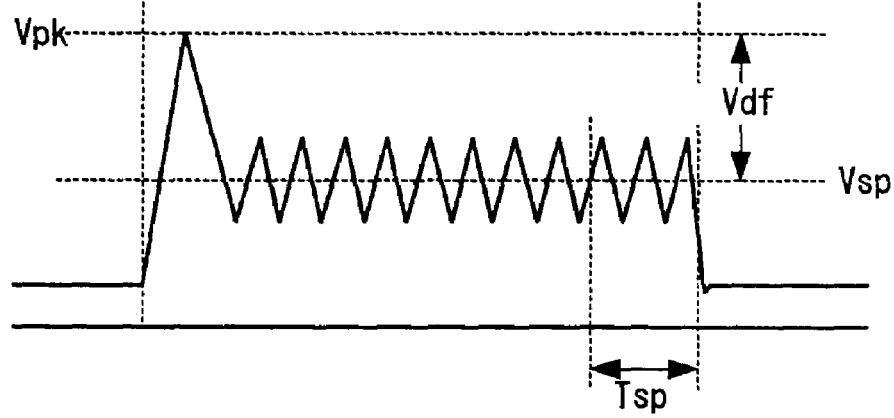

The total reflected light amount S3T from the 3T pit can be determined from an area of the RF signal as shown in FIG. 3(*b*) corresponding to the reflected light from the optical disc 10 when 3T is recorded by using the 3T recording pulse shown in FIG. 3(*a*).

And, the total reflected light amount S14T from the 14T pit can be determined from an area of the RF signal as shown in FIG. 3(*d*) corresponding to the reflected light from the optical disc 10 when 14T is recorded by using the 14T recording pulse (recording pulse by a pulse train method) as shown in FIG. 3(*c*).

Specifically, a voltage corresponding to the value of the total reflected light amount S3T from the 3T pit is output from the reflected light amount detecting circuit 263 shown in FIG. 2, and a voltage corresponding to the value of the total reflected amount S14T from the 14T pit is output from the reflected light amount detecting circuit 264 shown in FIG. 2. Therefore, the division circuit 265 divides the output of the reflected light amount detecting circuit 263 by the reflected light amount detecting circuit 264, so that the reflected light amount ratio (X2), which is a ratio of the total reflected light amount S3T from the 3T pit to the total reflected light amount S14T from the 14T pit at the time of recording, can be determined.

Here, the 3T pit is a pit shorter than the spot diameter of the laser light, and the 14T pit is a pit sufficiently longer than the spot diameter of the laser light. The reflected light amount ratio (X2) is variable depending on a state of the surface of the optical disk 10, such as tilting with respect to the laser beam, and consequently includes information mainly depending on the surface state of the optical disc 10.

The differential light intensity value (X1) is an optical intensity value for a difference between the peak value Vpk at the front end of the pit of the RF signal corresponding to the 14T pit at the time of recording and the average value Vsp at the rear portion excepting the front end as described above.

When the 14T pit is formed by the 14T recording pulse according to the pulse train method as shown in FIG. 3(*c*), the RF signal shown in FIG. 3(*d*) is obtained from the optical disc 10. Here, the peak value at the front end of the pit of the RF signal is Vpk, the average value of the rear portion excepting the front end during the sampling period Tsp is determined to be Vsp, and differential light intensity value (X1) is determined from difference Vdf of the peak value Vpk from the average value Vsp.

Specifically, the peak value Vpk at the front end of the pit of the reflected light current from the 14T pit is output from the peak value detecting circuit 266 shown in FIG. 2, and the average value Vsp of the reflected light current at the rear portion of the 14T pit is output from the sample-and-hold circuit 267. Therefore, the differential light intensity value (X1) can be determined by determining a difference between the peak value detecting circuit 266 and the sample-and-hold circuit 267 by the subtraction circuit 268.

Here, because the pit is sufficiently longer than the spot diameter of the laser light, the RF signal becomes a signal which depends on only the recording power without being influenced by the surface conditions of the optical disc 10, such as tilting relative to the laser beam. As a result, the differential light intensity value (X1) includes information mainly depending on the recording power of the laser light irradiated to the optical disc 10.

The differential light intensity value (X1) can be detected by the RF signal from the pit which is sufficiently longer than the spot diameter of the laser light, and the reflected light amount ratio (X2) can be detected by using the RF signal from the pit shorter than the spot diameter of the laser light and the RF signal from the pit longer than the spot diameter of the laser light. Therefore, the recording power deviation detection section of FIG. 2 uses the 14T pit which is the longest pit on DVD-R as a pit sufficiently longer than the spot diameter of the laser light, and the 3T pit which is the shortest pit on DVD-R as a pit shorter than the spot diameter of the laser light. But, the above procedure is not limitative of the invention.

A relation of the pit length to the spot diameter of the laser light can be detected as follows.

Figure 5:
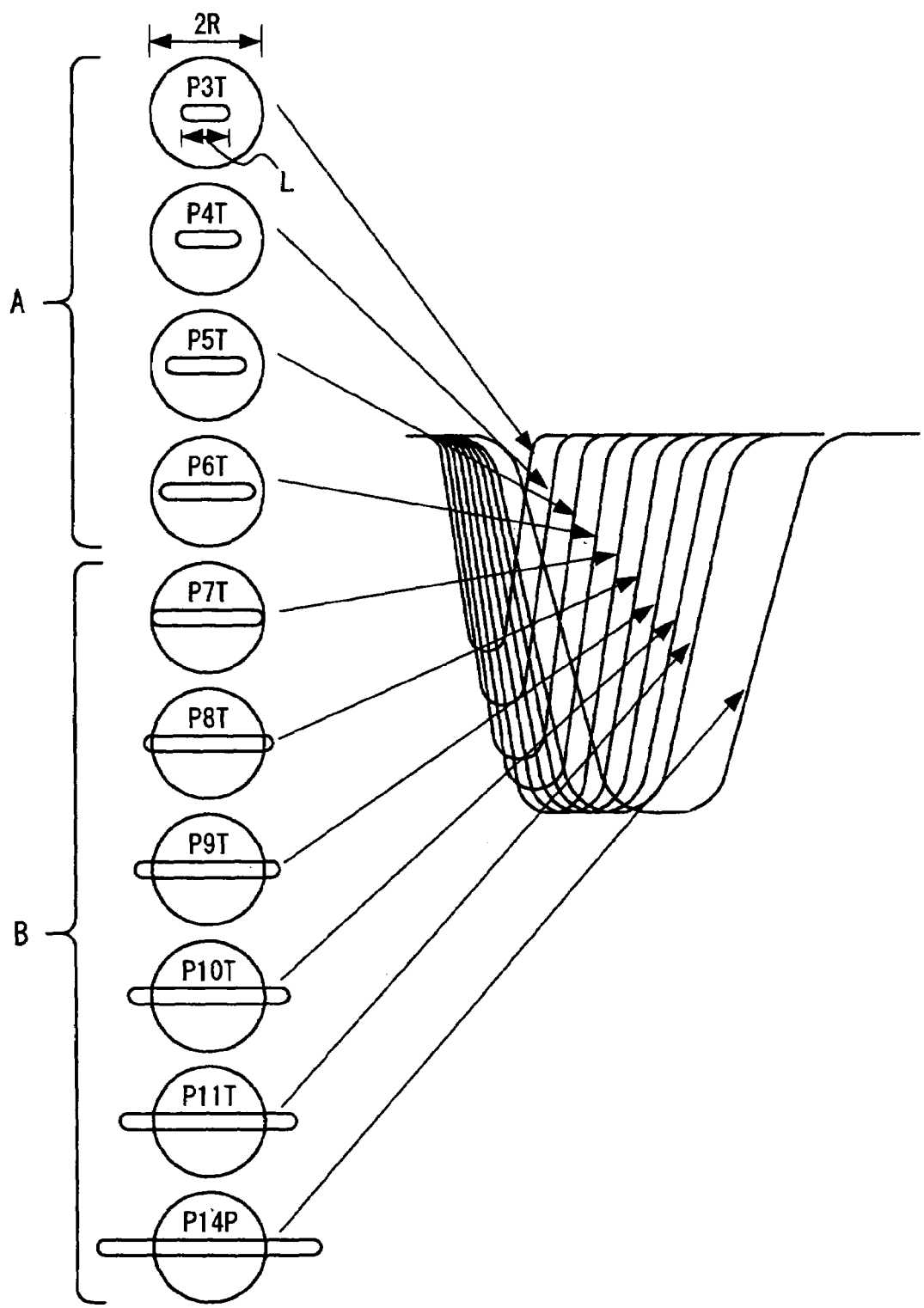
FIG. 5 is a diagram illustrating a relation between a laser spot diameter and a pit length according to the embodiment of the present invention.

Specifically, the RF signals from the pits P3T to P11T and P14T having lengths 3T to 11T and 14T of DVD-R are examined, and when pit length L is in area A which is shorter than spot diameter 2R as shown in FIG. 5, the level of the RF signal increases gradually as the pit length becomes long but becomes saturated and has a constant value when the pit length L is in area B which is longer than the spot diameter 2R.

And, the eye patterns of the RF signals from the pits P3T to P11T and P14T having lengths 3T to 11T and 14T of DVD-R are examined. When the pit length is shorter than the spot diameter as shown in FIG. 6, the amplitudes increase sequentially as the pit length becomes long but become saturated and have a constant vale when the pit length is longer than the spot diameter.

When DVD-R (4.7-GB disc) has a linear velocity of 3.49 ms, length 1T is about 0.13 µm. And, FIG. 5 and FIG. 6 show that the level or amplitude of the RF signal of the 7T pit is the maximum value. The length of the 7T pit is considered to be equal to the spot diameter. Therefore, the spot diameter becomes about 0.9 µm.

Figure 6:
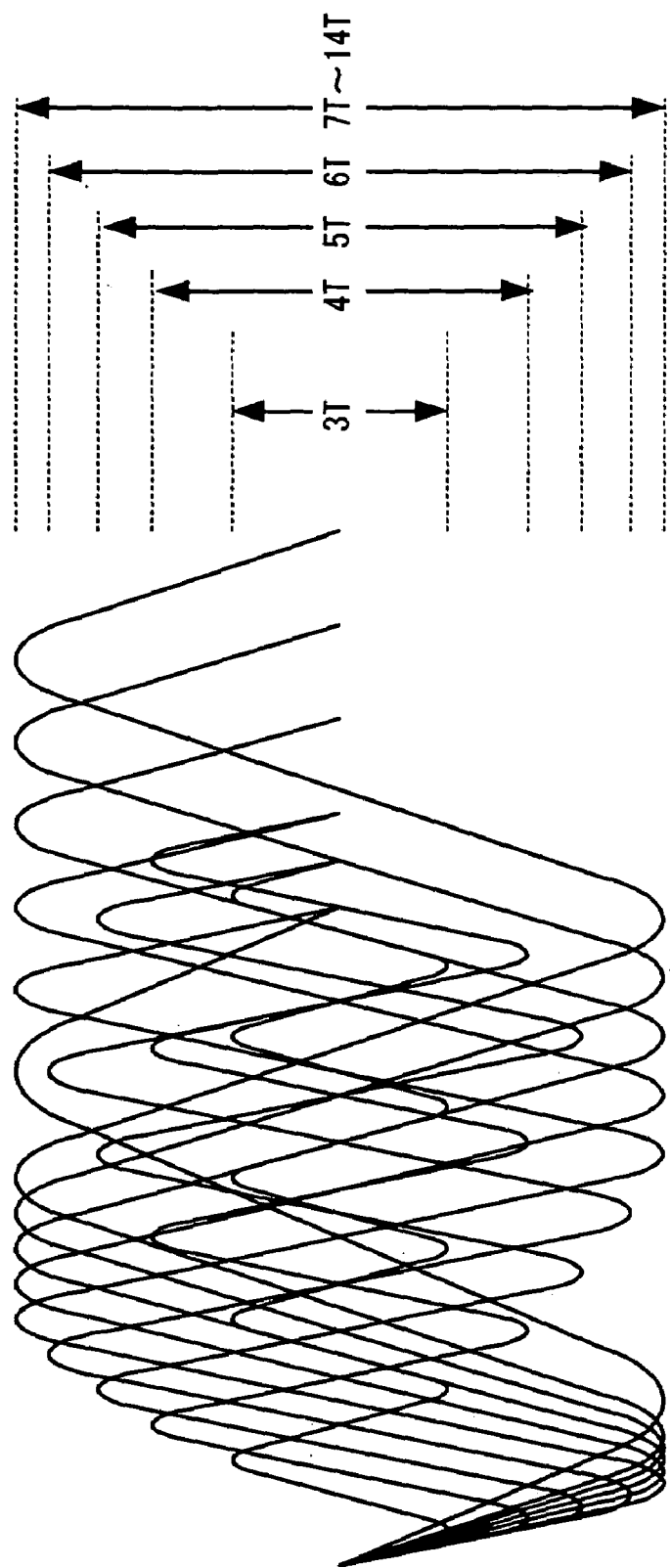
FIG. 6 is a diagram illustrating the relation between the laser spot diameter and the pit length with reference to an eye pattern according to the embodiment of the present invention.

Accordingly, a pit having a length smaller than the spot diameter of the laser light and a pit having a length larger than the spot diameter can be selected from the pit length with which the level or amplitude of the RF signal shown in FIG. 5 or 6 becomes saturated.

Then, processing according to the present invention for the information recording process by the system controller 28 will be described in detail with reference to the flow charts shown in FIG. 7 to FIG. 10.

The system controller 28 performs OPC to start recording information. A relational expression for correcting the recording power to an optimum value when OPC is performed is determined, and this relational expression is used to correct the recording power in real time when actually recording information.

Figure 7:
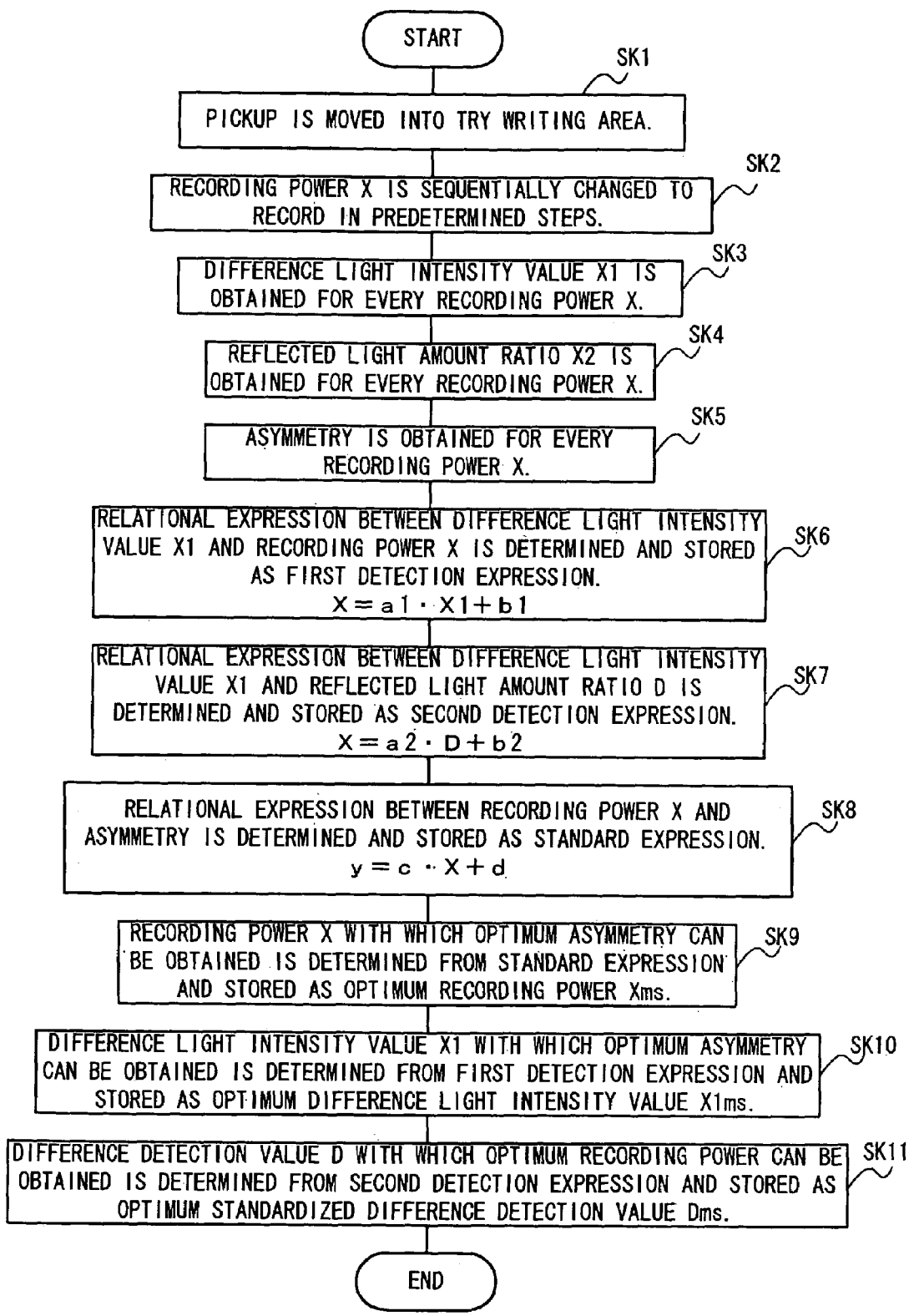
FIG. 7 is a flow chart illustrating processing for correction of a recording power according to the embodiment of the present invention.

Specifically, the system controller 28 moves the optical pickup 23 to a try writing area of the optical disc 10 at the implementation of OPC as shown in FIG. 7 (SK1) and records test data while sequentially changing the recording power (X) in predetermined steps (SK2).

While the test data is being recorded, the differential light intensity value (X1) and the reflected light amount ratio (X2) are obtained for the every recording power (X) according to the output signal of the recording power deviation detection section 26 (SK3, SK4).

Then, the system controller 28 enters the output of the asymmetry detection section 27 while reproducing the recorded information to obtain asymmetry (y) for the every recording power (X) (SK5). The asymmetry (y) is a value corresponding to β calculated from the aforesaid expression (A) or (B).

Using the result of the aforesaid SK3, the relational expression of the differential light intensity value (X1) and the recording power (X) is determined as indicated by the expression (1) below, and it is stored as a first detection expression into an unshown memory (SK6).

$$X = a1 \cdot X1 + b1 \quad (1)$$

where, a1 and b1 are constant.

Using the results of the aforesaid SK3 and SK4, a difference between the differential light intensity value (X1) and the reflected light amount ratio (X2) is determined as difference detection value D. And, the relational expression of the difference detection value D and the recording power (X) is determined as indicated by the expression (2) below, and it is stored as a second detection expression into memory (SK7).

$$X = a2 \cdot D + b2 \quad (2)$$

where, a2, b2 are constant.

Using the results of the aforesaid SK5, the relational expression of the recording power (X) and the asymmetry (y) is determined by expression (3) below, and it is stored as a standard expression into memory (SK8).

$$y = c1 \cdot X + d1 \quad (3)$$

where, c1, d1 are constant.

The system controller 28 calculates the recording power (X) enabling to obtain optimum asymmetry (y) which conforms to the standard by using the aforesaid standard expression, and the obtained value is stored as optimum recording power (Xms) into memory (SK9).

Then, the system controller 28 calculates the differential light intensity value (X1) capable of obtaining the above optimum recording power (Xms) by using the above first expression. And, this value is stored as optimum differential light intensity value (X1ms) into memory (SK10).

The system controller 28 calculates difference detection value (X2ms) capable of obtaining the aforesaid optimum recording power (Xms) by using the second detection expression, and this value is stored as optimum standardized difference detection value (Dms) into memory (SK11).

Through the aforesaid processing, the first detection expression ($X = a1 \cdot X1 + b1$), the second detection expression ($X = a2 \cdot D + b2$), the standard expression ($y = c1 \cdot X + d1$), the optimum differential light intensity value (X1ms), the optimum standardized difference detection value (Dms) and the optimum recording power (Xms) are stored into the system controller 28.

Figure 8:
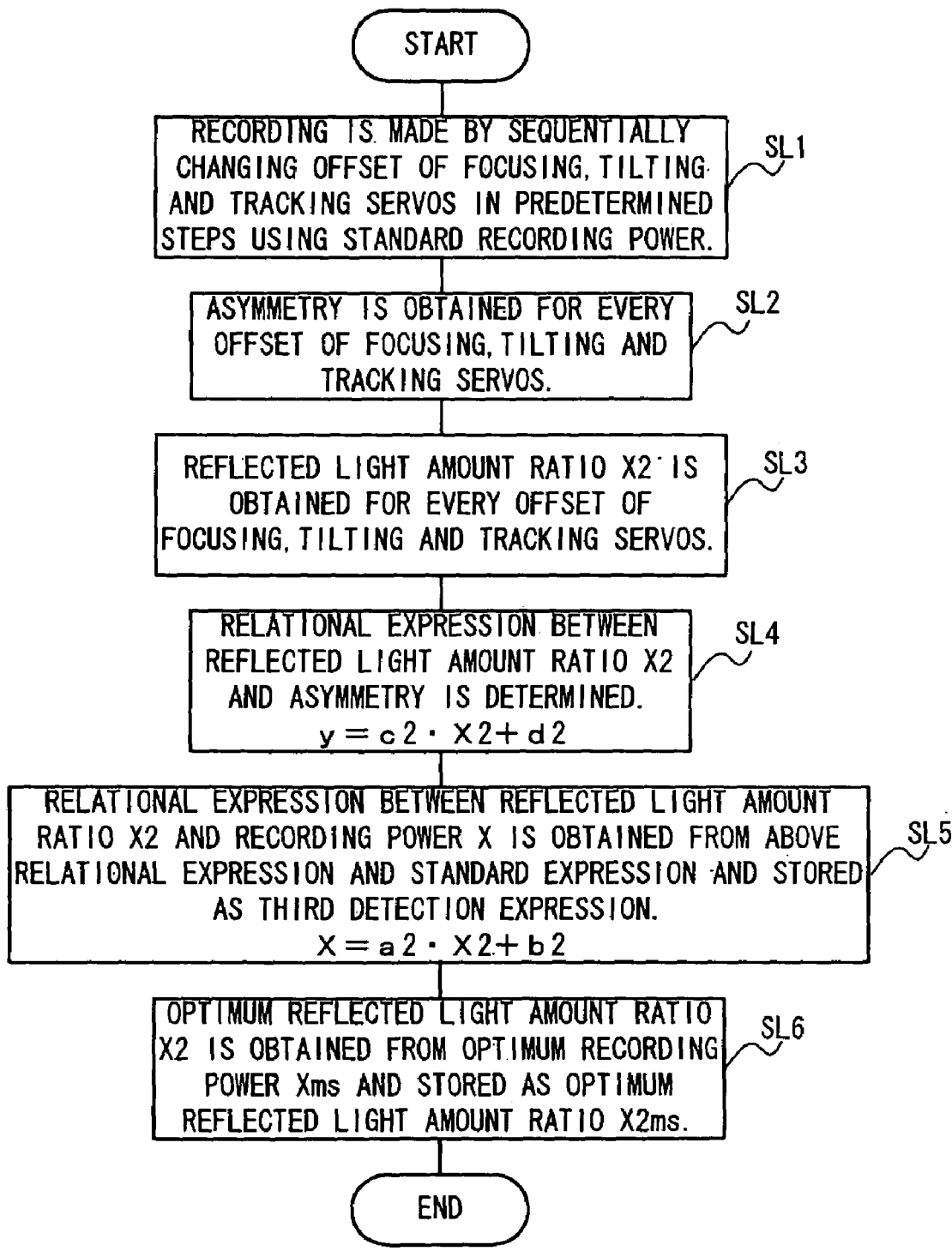
FIG. 8 is a flow chart illustrating the processing for correction of the recording power according to the embodiment of the present invention.

Besides, the system controller 28 performs the processing shown in FIG. 8 when OPC is implemented to determine a third detection expression and an optimuim reflected light amount ratio (X2ms) and stores them into memory.

Specifically, the system controller 28 uses the aforesaid optimum recording power (Xms) at implementing OPC to change at least one servo based offset among focusing, tilting and tracking, which are controlled by the servo control section 25, in predetermined steps so to record test data (SL1) and reproduces it to obtain asymmetry (y) for every offset value according to the output of the asymmetry detection section 27 (SL2).

Furthermore, the reflected light amount ratio (X2) is obtained for every offset value according to the output of the recording power deviation detection section 26 (SL3).

Subsequently, the system controller 28 uses the results of the aforesaid SL2 and SL3 to determine the relational expression of the reflected light amount ratio (X2) and the asymmetry (y) as indicated by the following expression (4) (SL4).

$$y = c2 \cdot X2 + d2 \quad (4)$$

where, c2 and d2 are constant.

And, the relational expression of the reflected light amount ratio (X2) and the recording power (X) is determined as indicated by the following expression (5) from the expression (4) and the standard expression (3) and stored as a third detection expression into memory (SL5).

$$X = a3 \cdot X2 + b3 \quad (5)$$

where, a3 and b3 are constant.

Furthermore, the system controller 28 determines the reflected light amount ratio (X2) with which the optimum recording power (Xms) can be obtained and stores the obtained value as the optimum reflected light amount (X2ms) into memory (SL6).

Figure 9:
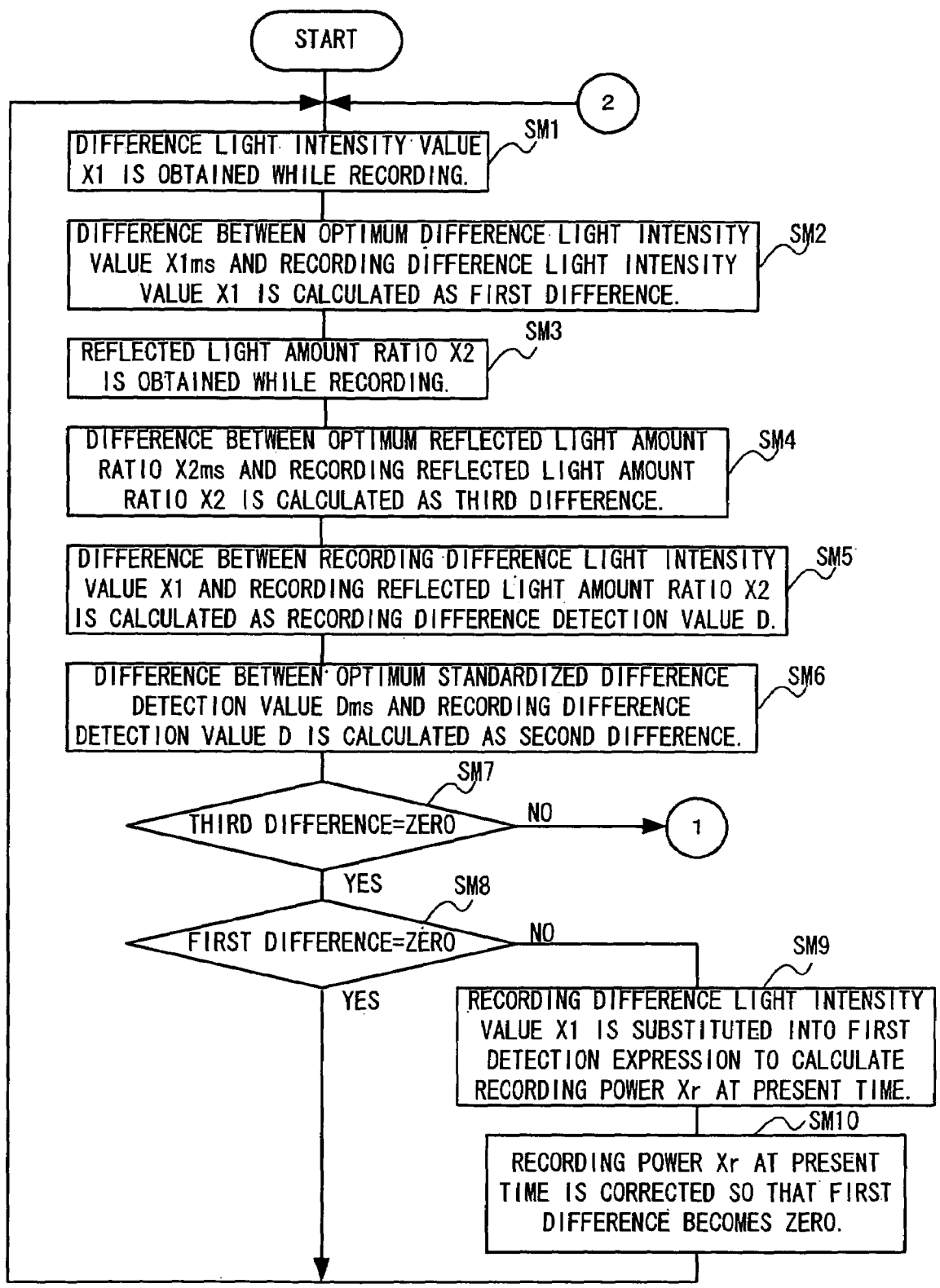
FIG. 9 is a flow chart illustrating the processing for correction of a recording power according to the embodiment of the present invention.
Figure 10:
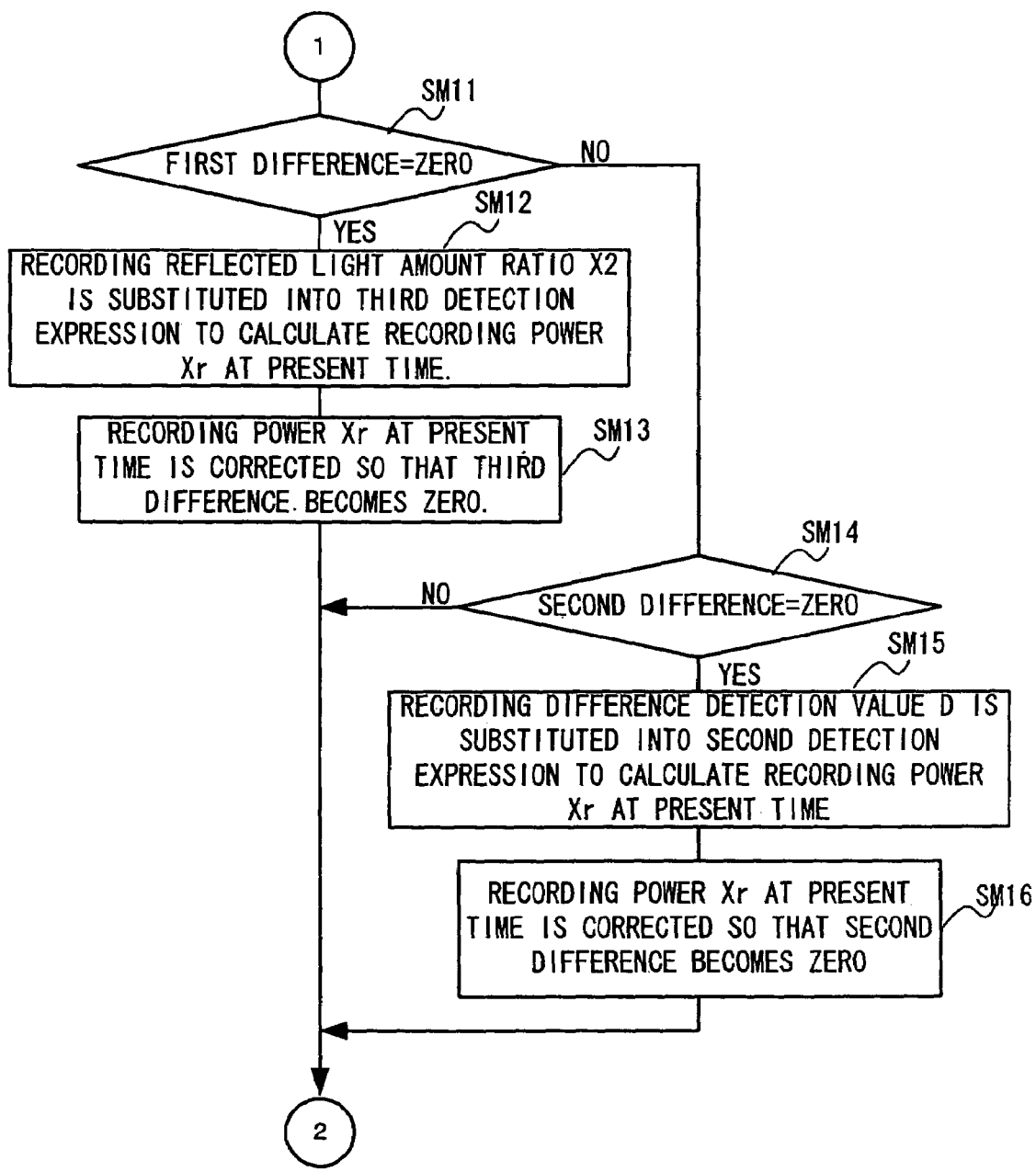
FIG. 10 is a diagram illustrating correction processing of the recording power according to the embodiment of the present invention.

After performing the above processing at implementing OPC, the system controller 28 actually records information while correcting the recording power in real time as shown in FIG. 9 and FIG. 10.

Specifically, when information is actually recorded, the system controller 28 obtains the recording differential light intensity value (X1) according to the output signal of the recording power deviation detection section 26 (SM1), compares the differential light intensity value (X1) with the stored optimum differential light intensity value (X1ms) and calculates the difference as a first difference (SM2).

Then, the system controller 28 obtains the recording reflected light amount ratio (X2) according to the output signal of the recording power deviation detection section 26 (SM3), compares the reflected light amount ratio (X2) with the stored optimum reflected light amount ratio (X1ms) and calculates the difference as a third difference (SM4).

Besides, a difference between the recording differential light intensity value (X1) and the recording reflected light amount ratio (X2) is calculated as recording difference detection value (D) according to the results of the aforesaid SM1 and SM3 (SM5).

Then, the system controller 28 calculates a difference between the stored optimum standardized difference detection value (Dms) and the difference detection value (D) obtained by the above SM5 as a second difference (SM6).

Subsequently, it is judged whether the third difference determined by the above SM4 is zero or not (SM7), and when it is zero, it is further judged whether the first difference is zero or not (SM8).

As a result, when the first difference is zero, the procedure goes to SM1, and when it is not zero, the recording differential light intensity value (X1) obtained by SM1 is substituted into the first detection expression to calculate recording power (Xr) at the present time (SM9).

A control instruction is output to the laser control section 24 so that the first difference becomes zero, and the calculated recording power (Xr) is corrected (SM10). Subsequently, the procedure goes to the above SM1.

When the third difference is not zero as a result of the judgment by the SM7 above, it is judged whether the first difference is zero or not (SM11).

As a result, when the first difference is zero, the recording reflected light amount ratio (X2) obtained by the SM3 above is substituted into the third detection expression to calculate the recording power (Xr) at the present time (SM12).

A control instruction is output to the laser control section 24 so that the third difference becomes zero, and the calculated recording power (Xr) is corrected (SM13).

When the first difference is not zero as a result of the judgment made in the SM11, it is judged whether the second difference is zero or not (SM14), and when it is zero, the procedure goes to the SM1 above.

When the second difference is zero, the recording difference detection value (D) determined by the processing of the above SM5 is substituted into the second detection expression to determine the recording power (Xr) at the present time (SM15).

And, a control instruction is output to the laser control section 24 so that the second difference becomes zero, and the calculated recording power (Xr) is corrected (SM16).

The above processing will be described with reference to FIG. 11 to FIG. 14.

Figure 11:
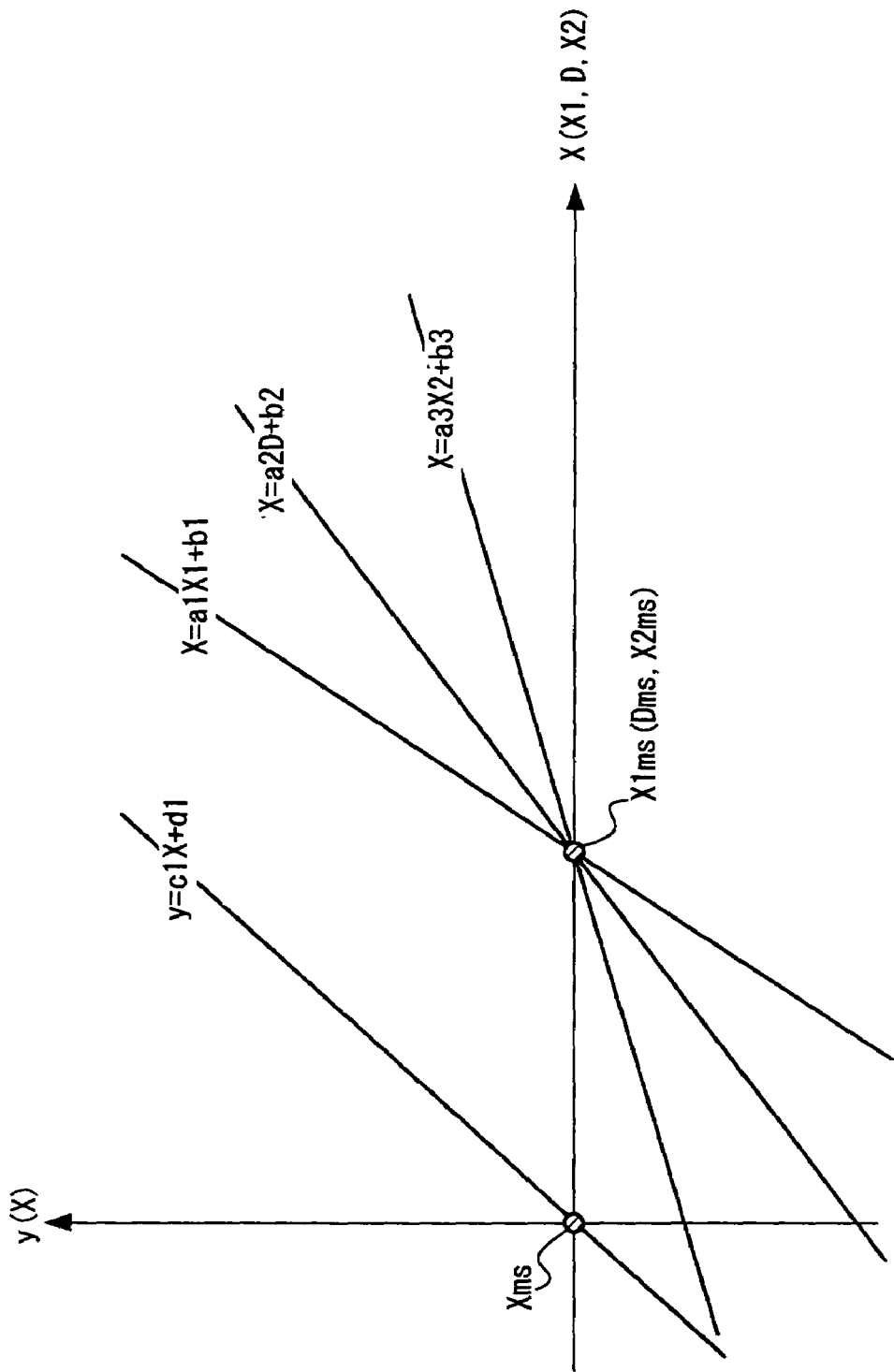
FIG. 11 is a diagram illustrating correction processing of a recording power according to the embodiment of the present invention.

FIG. 11 shows a relation among the aforesaid standard expression, the first detection expression, the second detection expression and the third detection expression.

In FIG. 11, the vertical axis indicates the asymmetry y or the recording power X, and the horizontal axis indicates the recording power X, the differential light intensity detection value X1, the difference detection value D or the reflected light amount ratio X2.

In the standard expression, the recording power X with which the asymmetry y indicates the optimum value is the optimum recording power Xms.

The differential light intensity detection value X1 with which the recording power X becomes the optimum recording power Xms in the first detection expression is the optimum differential light intensity detection value X1ms, the difference detection value D with which the recording power X becomes the optimum recording power Xms in the second detection expression is the optimum standardized difference detection value Dms, and the reflected light amount ratio X2 with which the recording power X becomes the optimum recording power Xms in the second detection expression is the optimum reflected light amount ratio X2ms.

Figure 12:
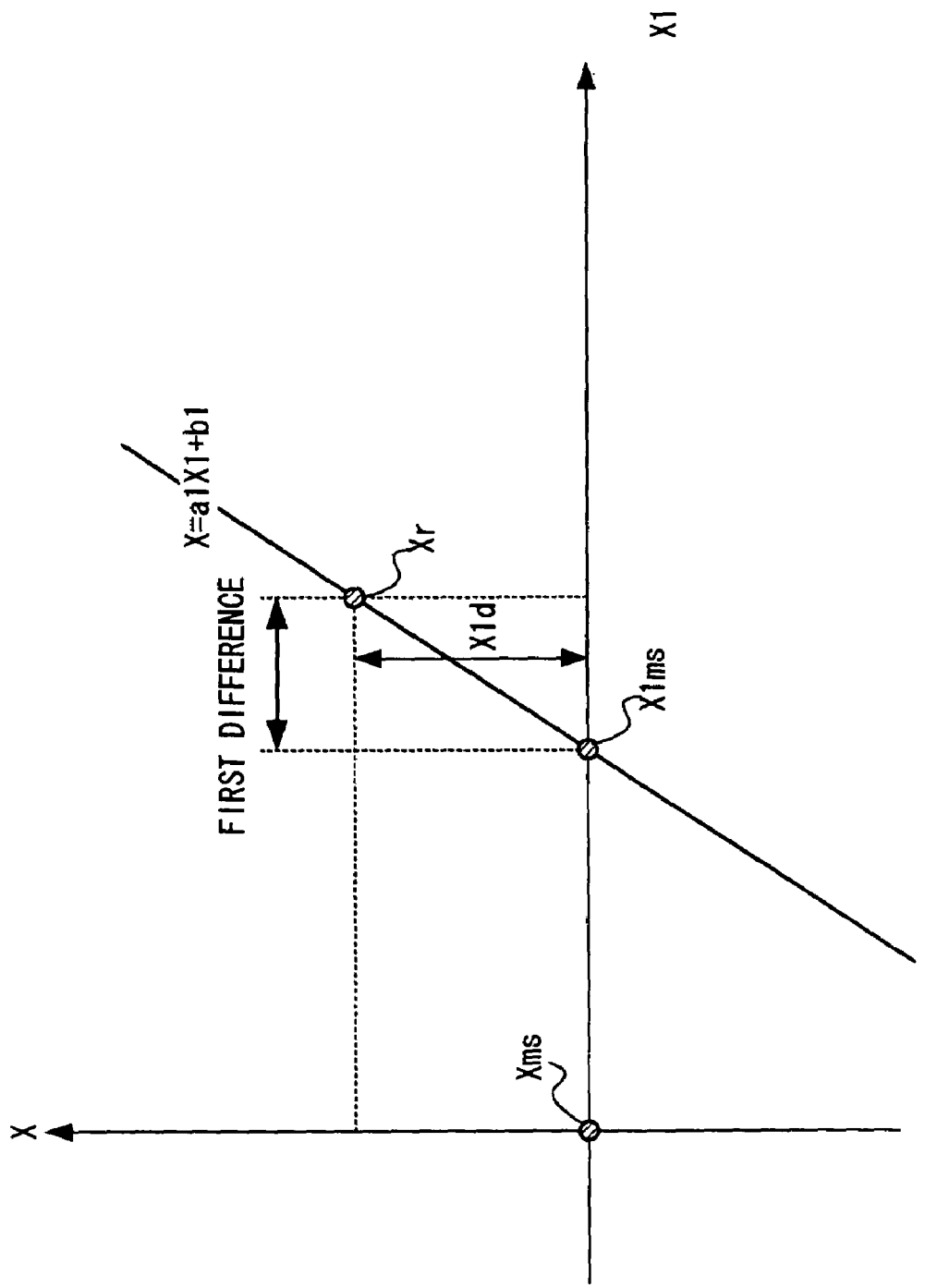
FIG. 12 is a diagram illustrating correction processing of a recording power according to the embodiment of the present invention.

When the third difference is zero and the first difference is other than zero when judged by the SM7 and SM8, correction corresponding to the surface conditions of the optical disc 10, such as tilting relative to the laser beam, is not necessary. But correction corresponding to only the recording power may be made. Therefore, as shown in FIG. 12, the recording power (Xr) at the present time is determined according to the first detection expression, a control instruction for correcting only a difference between the recording power (Xr) required at present to make the first difference zero and the recording power corresponding to the optimum differential light intensity detection value (X1ms) is output to the laser control section 24 to optimize the laser output power <recording power>.

Figure 13:
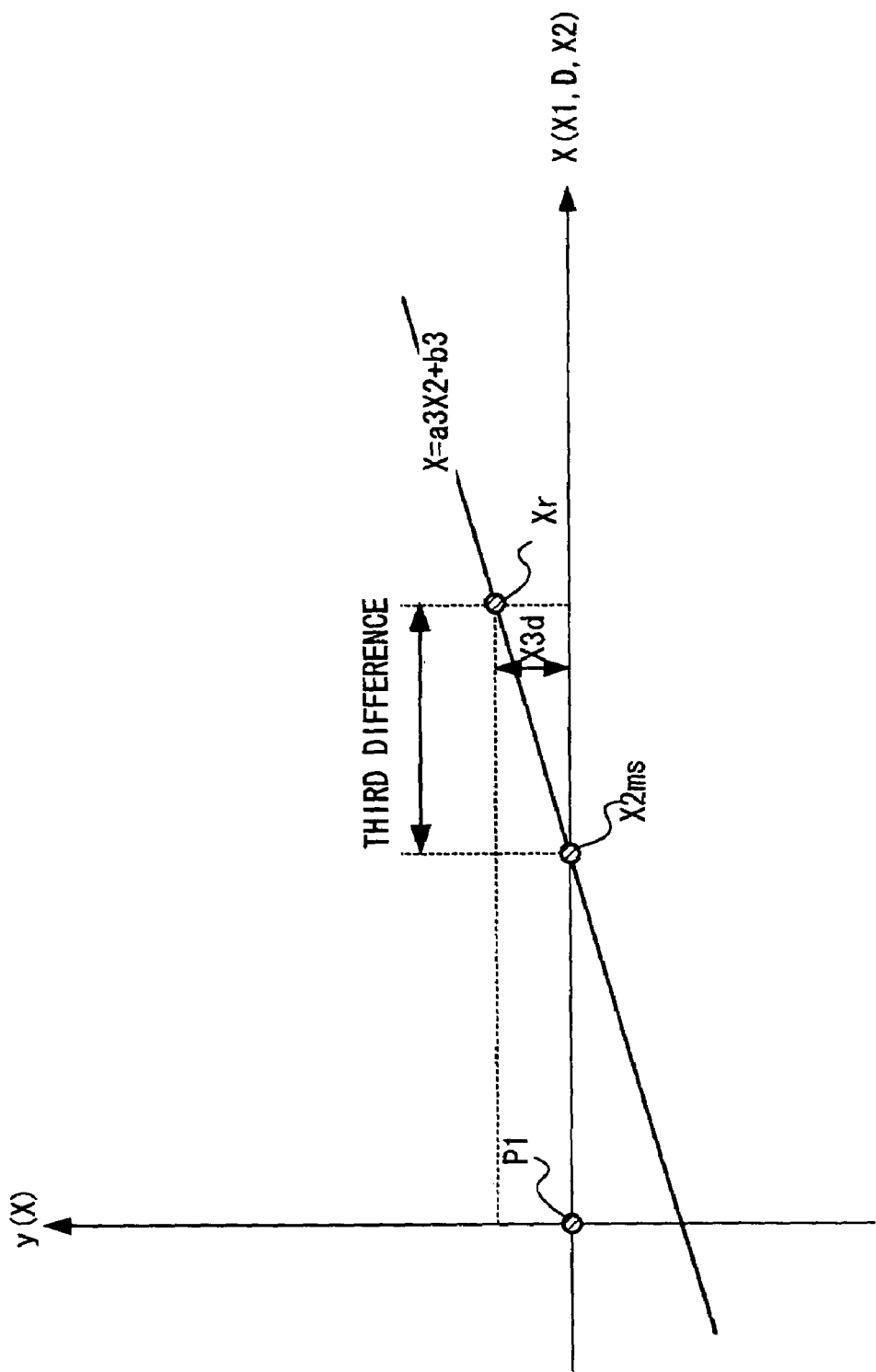
FIG. 13 is a diagram illustrating correction processing of a recording power according to the embodiment of the present invention.

When the third difference is a value other than zero and the first difference is zero in the judgment of SM7 and SM11, the correction may be made according to the surface conditions of the optical disc 10 such as tilting relative to the laser beam. Therefore, as shown in FIG. 13, a control instruction to determine the recording power (Xr) at the present time according to the third detection expression and to correct only a difference between the recording power (Xr) at the present time required to make the third difference zero and the recording power corresponding to the optimum reflected light amount ratio (X2ms) is output to the laser control section 24 to optimize the laser output power <recording power>.

Figure 14:
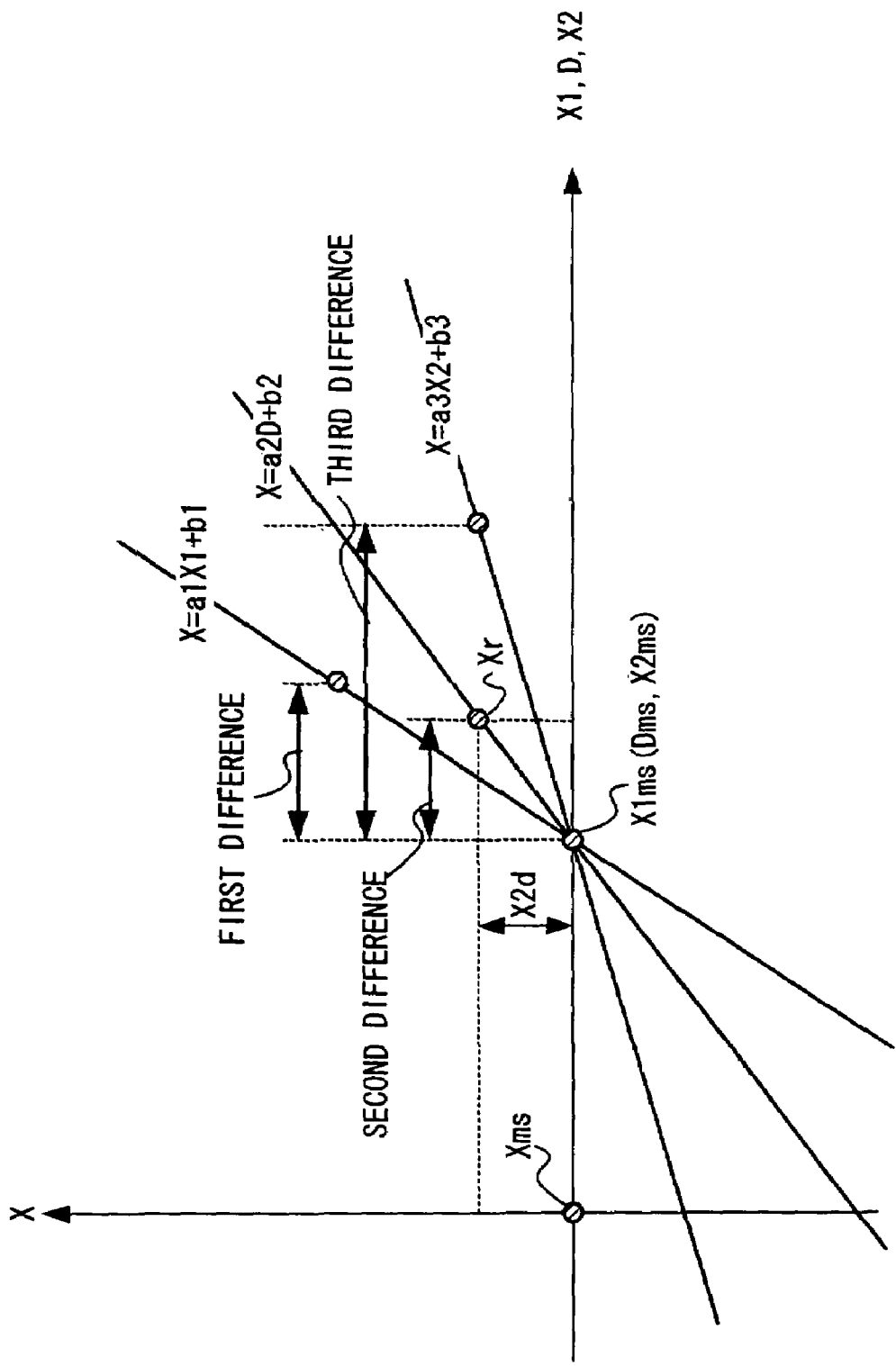
FIG. 14 is a diagram illustrating correction processing of a recording power according to the embodiment of the present invention.

When the third difference, the first difference and the second difference are any value other than zero in the judgments made in the SM7, SM11 and SM14, correction corresponding to the recording power and correction corresponding to the surface conditions of the optical disc 10, such as tilting relative to the laser beam, are required. As shown in FIG. 14, a control instruction to determine the recording power (Xr) at the present time according to the second detection expression and to correct only a difference between the recording power (Xr) at the present time required to make the second difference zero and the recording power corresponding to the optimum reflected light amount ratio (X2ms) is output to the laser control section 24 to optimize the laser output power <recording power>.

Thus, according to the embodiment, even if the optical disc 10 is inclined, pits are formed while changing the recording laser light intensity to obtain the optimum reflected light amount from the optimum asymmetry and the pits being formed. Therefore, even if the optical disc 10 is inclined, reduction of the irradiated light amount per unit area caused in connection with the inclination of the information recording surface of the optical disc 10 can be corrected without correcting the direction of emitting the recording laser light.

Accordingly, pits having a necessary and sufficient shape can be formed at appropriate positions, and information can be recorded so to provide remarkable information reproducing characteristics.

Besides, it is not necessary to have a complex mechanism to make the direction to irradiate the recording laser light perpendicular to the information recording surface of the optical disc 10. Thus, the cost for the device can be reduced as compared with the conventional device.

And, this embodiment can deal with not only the inclination of the optical disc 10 but also a difference in types of media and a partial difference of reflectance on the optical disc and can always record information (form pits) by the optimum recording power (recording laser light intensity).

This embodiment can improve the processing speed because the first to third detection expressions and the standard expression are determined to be a linear expression (linear function).

It is to be understood that the embodiment described above is only an example of the present invention and not limitative of the present invention.

INDUSTRIAL APPLICABILITY

The present invention provides an optical information recording method and device, which can record information while keeping the irradiation of laser light in a given direction even if the information recording surface of an optical information recording medium is inclined, and a recording medium on which an optical information recording control program is recorded.

According to the present invention, the optical information recording method forms pits while changing the laser light intensity according to the inclination of the optical information recording medium, so that even if the optical information recording medium is inclined, a reduced portion of the irradiated light amount per unit area caused in connection with the inclination of the information recording surface can be corrected without necessity of correcting the laser light irradiating direction. Thus, pits having a necessary and sufficient shape can be formed at appropriate positions, so that information can be recorded to provide remarkable information reproducing characteristics.

In addition to the above effects, the present invention can reduce the correcting time for the laser light intensity which is effected at actual recording of information.

In addition to the above effect, according to the optical information recording method of the present invention, accurate correction processing can also be made even if the spot diameter of the recording laser light is somewhat changed.

According to the optical information recording device of the present invention, pits can be formed while changing the laser light intensity according to the inclination of the optical information recording medium. Thus, even if the optical information recording medium is inclined, a reduced portion of the irradiated light amount per unit area which is caused in connection with the inclination of the information recording surface can be corrected. Thus, the pits having necessary and sufficient shape can be formed at appropriate positions, so that information can be recorded to provide remarkable information reproducing characteristics. Besides, the device cost can be reduced because it is not necessary to have any means for correcting the laser light irradiating direction as the conventional one did.

According to the optical information recording device of the present invention, the time for correcting the laser light intensity which is effected in actual recording of information can be made short in addition to the aforesaid effects.

Besides, the accurate correction can be made by the optical information recording device of the present invention even if the spot diameter of the recording laser light is somewhat changed.

According to the recording medium of the invention on which the optical information recording control program is recorded, the pits can be formed while changing the laser light intensity depending on the inclination of the optical information recording medium by operating a computer according to the program. Therefore, even if the optical information recording medium is inclined, it is not necessary to correct the laser light irradiation direction, and a reduced portion of the irradiated light amount per unit area caused in connection with the inclination of the information recording surface can be corrected. Thus, pits having a necessary and sufficient shape can be formed at appropriate positions, so that information can be recorded to provide remarkable information reproducing characteristics.

The invention claimed is:

1. An optical information recording method which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the method comprising the steps of:

changing sequentially a recording power of laser light to be irradiated to the optical information recording medium to record on the optical information recording medium before actual recording of information and also detecting asymmetry for every recording power to determine a first relation between the asymmetry and the recording power;

fixing the recording power to a predetermined recording power and sequentially changing a spatial positional relation of the laser light to the optical information recording medium to record on the optical information recording medium and also detecting a reflected light amount ratio related to the asymmetry and pits having different lengths for every spatial positional relation to determine a second relation between the asymmetry and the reflected light amount ratio;

determining a third relation between the recording power and the reflected light amount ratio according to the first relation and the second relation and also determining an optimum reflected light amount ratio corresponding to an optimum recording power; and detecting the reflected light amount ratio at the time of actual recording of information to determine a recording power corresponding to the detected reflected light amount ratio according to the third relation, and correcting the recording power so that a difference between the detected reflected light amount ratio and the optimum reflected light amount ratio becomes zero.

2. The optical information recording method according to claim 1, wherein the spatial positional relation of the laser light to the optical information recording medium is sequentially changed by changing at least one servo based offset among focusing, tilting and tracking of an optical pickup for irradiating the laser light to the optical information recording medium in predetermined steps.

3. The optical information recording method according to claim 1, wherein the optimum recording power is determined according to the first relation, and the predetermined recording power is set to the determined optimum recording power.

4. The optical information recording method according to claim 1, wherein the reflected light amount ratio is obtained by detecting a first total reflected light amount from a first pit smaller than a spot diameter of the laser light spot and a second total reflected light amount from a second pit larger than the spot diameter and calculating from a ratio of the first total reflected light amount to the second total reflected light amount.

5. The optical information recording method according to claim 4, wherein the first pit is a pit having a minimum length used to record the information, and the second pit is a pit having a maximum length used to record the information.

6. An optical information recording method which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the method comprising the steps of:

performing first recording to record test data on the optical information recording medium by sequentially changing a recording power of the laser light irradiated to the optical information recording medium at the time of a recording laser light intensity optimization processing before actual recording of information;

performing second recording to record test data on the optical information recording medium by sequentially changing a spatial positional relation of the laser light to the optical information recording medium with the recording power fixed;

detecting, at the time of the first recording, the recording power and first information mainly depending on the recording power for every recording power, and asymmetry and second information depending on the spatial positional relation, and storing a first relation with the first information to the recording power, a second relation with the second information to the recording power and a relation with the recording power to the asymmetry;

determining and storing an optimum recording power by which an optimum asymmetry is obtained from the relation with the recording power to the asymmetry, and storing optimum first information and optimum second information corresponding to the optimum recording power from the first relation and the second relation;

detecting, at the time of the second recording, asymmetry and third information mainly depending on the spatial positional relation and storing a relation with the third information to the asymmetry;

determining and storing a third relation with the third information to the recording power from the relation with the recording power to the asymmetry stored at the time of the first recording and the relation of the second information to the asymmetry stored at the time of the second recording, and storing optimum third information corresponding to the optimum recording power from the third relation;

detecting the first information, the second information and the third information at the time of actual recording of information;

determining a first difference between the detected first information and the optimum first information, a second difference between the detected second information and the optimum second information and a third difference between the detected third information and the optimum third information;

when the third difference is zero and the first difference is not zero, determining a recording power according to the detected first information and the first relation, and correcting the recording power so that the first difference becomes zero;

when the third difference is not zero and the first difference is zero, determining a recording power according to the detected third information and the third relation, and correcting the recording power so that the third difference becomes zero; and when the third difference is not zero, the first difference is not zero and the second difference is not zero, determining a recording power according to the detected second information and the second relation, and correcting the recording power so that the second difference becomes zero.

7. The optical information recording method according to claim 6, wherein the spatial positional relation of the laser light to the optical information recording medium is sequentially changed by changing at least one servo based offset among focusing, tilting and tracking of the optical pickup for irradiating the laser light to the optical information recording medium in predetermined steps.

8. The optical information recording method according to claim 6, wherein the second recording is performed with the recording power fixed to the optimum recording power determined from the relation of the recording power with the asymmetry.

9. The optical information recording method according to claim 6, wherein the first information is a differential light intensity value which is a difference between a maximum value of reflected light intensity at a front end and an average value of the reflected light intensity at a rear end of a pit larger than the spot diameter of the laser light spot.

10. The optical information recording method according to claim 9, wherein the pit larger than the spot diameter of the laser light spot is a pit having a maximum length used to record the information.

11. The optical information recording method according to claim 6, wherein the second information is a difference detection value which is a difference between a differential light intensity value, which is a difference between a maximum value of reflected light intensity at a front end and an average value of the reflected light intensity at a rear end of a pit larger than the spot diameter of the laser light spot, and a reflected light amount ratio, which is a ratio of a total reflected light amount from a pit smaller than the spot diameter to a total reflected light amount from the pit larger than the spot diameter.

12. The optical information recording method according to claim 11, wherein the pit larger than the spot diameter of the laser light spot is a pit having a maximum length used to record the information, and the pit smaller than the spot diameter of the laser light spot is a pit having a minimum length used to record the information.

13. The optical information recording method according to claim 6, wherein the third information is a reflected light amount ratio which is a ratio of the total reflected light amount from the pit smaller than the spot diameter to the total reflected light amount from the pit larger than the spot diameter.

14. The optical information recording method according to claim 13, wherein the pit larger than the spot diameter of the laser light spot is a pit having a maximum length used to record the information, and the pit smaller than the spot diameter of the laser light spot is a pit having a minimum length used to record the information.

15. An optical information recording method which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the method comprising:

a first step of recording test data on the optical information recording medium by sequentially changing a recording power of the laser light irradiated to the optical information recording medium at the time of processing to optimize recording laser light intensity before actual recording of information;

a second step of detecting, in the first step, a differential light intensity value which is a difference between a maximum value of reflected light intensity at a front end and an average value of the reflected light intensity at a rear end of a pit larger than the spot diameter of the laser light spot, a reflected light amount ratio which is a ratio of a total reflected light amount from a pit smaller than the spot diameter to a total reflected light amount from the pit larger than the spot diameter and asymmetry in correspondence with the recording power, and calculating a difference between the differential light intensity value and the reflected light amount ratio as a difference detection value;

a third step of determining and storing a first detection expression which indicates a relation between the recording power and the differential light intensity value according to the differential light intensity value detected in the second step;

a fourth step of determining and storing a second detection expression which indicates a relation between the recording power and the difference detection value according to the difference detection value calculated in the second step;

a fifth step of determining and storing a standard expression which indicates a relation between the asymmetry and the recording power according to the asymmetry detected in the second step;

a sixth step of determining and storing an optimum recording power which enables to obtain optimum asymmetry according to the standard expression stored in the fifth step;

a seventh step of storing as an optimum differential light intensity value a differential light intensity value corresponding to the optimum recording power according to the optimum recording power determined in the sixth step and the first detection expression;

an eighth step of storing as an optimum standardized difference detection value a difference detection value corresponding to the optimum recording power according to the optimum recording power determined in the sixth step and the second detection expression;

a ninth step of recording test data on the optical information recording medium by sequentially changing at least one servo based offset among focusing, tilting and tracking of an optical pickup for irradiating the laser light to the optical information recording medium in a predetermined step with the recording power fixed to the optimum recording power determined in the sixth step;

a tenth step of detecting, in the ninth step, the reflected light amount ratio and the asymmetry for every offset;

an eleventh step of determining a relational expression of a reflected light amount ratio to the asymmetry according to the reflected light amount ratio and the asymmetry detected in the tenth step;

a twelfth step of determining and storing a third detection expression indicating a relation between the recording power and the reflected light amount ratio according to the relational expression determined in the eleventh step and the standard expression determined in the fifth step;

a thirteenth step of storing as an optimum reflected light amount ratio a reflected light amount ratio corresponding to the optimum recording power according to the optimum recording power determined in the sixth step and the third detection expression;

a fourteenth step of detecting the differential light intensity value and the reflected light amount ratio and calculating a difference detection value when actually recording information;

a fifteenth step of calculating a first difference between the differential light intensity value detected in the fourteenth step and the optimum differential light intensity value;

a sixteenth step of calculating a second difference between the difference detection value calculated in the fourteenth step and the optimum standardized difference detection value;

a seventeenth step of calculating a third difference between the reflected light amount ratio detected in the fourteenth step and the optimum reflected light amount ratio;

an eighteenth step of determining a recording power according to the first detection expression and the differential light intensity value detected in the fourteenth step when the third difference is zero and the first difference is not zero and correcting the recording power so that the first difference becomes zero;

a nineteenth step of determining a recording power according to the third detection expression and the reflected light amount ratio detected in the fourteenth step when the third difference is not zero and the first difference is zero and correcting the recording power so that the third difference becomes zero; and a twentieth step of determining a recording power according to the second detection expression and the difference detection value calculated in the fourteenth step when the third difference is not zero, the first difference is not zero and the second difference is not zero and correcting the recording power so that the second difference becomes zero.

16. The optical information recording method according to claim 15, wherein the first detection expression to the third detection expression each comprises a linear function.

17. The optical information recording method according to claim 15, wherein the pit larger than the spot diameter of the laser light spot is a pit having a maximum length used to record the information, and the pit smaller than the spot diameter of the laser light spot is a pit having a minimum length used to record the information.

18. An optical information recording device which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the device comprising:

an optical pickup which irradiates laser light to the optical information recording medium and receives reflected light from the optical information recording medium to output a light receiving signal;

laser control means which controls a recording power of the laser light output from the optical pickup;

servo-control means which controls at least one of focusing, tracking and tilting of the optical pickup;

reflected light amount ratio detecting means which detects, as a reflected light amount ratio, a ratio of a total reflected light amount from a pit smaller than the spot diameter to a total reflected light amount from a pit larger than the spot diameter of the laser light spot according to the light receiving signal output from the optical pickup;

asymmetry detecting means which detects asymmetry of the light receiving signal according to the light receiving signal output from the optical pickup;

first control means which performs first recording on the optical information recording medium by sequentially changing the recording power of the laser light irradiated to the optical information recording medium by controlling the laser control means and the servo-control means before actual recording of information, determines a first relation between the asymmetry and the recording power by detecting the asymmetry from the asymmetry detecting means for every recording power, performs second recording on the optical information recording medium by sequentially changing at least one offset among focusing, tilting and tracking of the optical pickup with the recording power fixed at a predetermined recording power in predetermined steps, determines a second relation between the asymmetry and the reflected light amount ratio by detecting asymmetry from the asymmetry detecting means and a reflected light amount ratio from the reflected light amount ratio detecting means for every offset, determines a third relation between the recording power and the reflected light amount ratio according to the first relation and the second relation, and determines an optimum reflected light amount ratio corresponding to the optimum recording power; and second control means which determines a recording power corresponding to the detected reflected light amount ratio according to the third relation by detecting a reflected light amount ratio from the reflected light amount ratio detecting means at actual recording of the information and corrects the recording power so that the difference between the detected reflected light amount ratio and the optimum reflected light amount ratio becomes zero.

19. The optical information recording device according to claim 18, wherein the first control means determines an optimum recording power according to the first relation determined at the first recording and sets a predetermined recording power of the second recording by the determined optimum recording power.

20. The optical information recording device according to claim 18, wherein the reflected light amount ratio detecting means comprises:

a first detecting circuit which detects a total reflected light amount from a first pit smaller than the spot diameter of the laser light spot according to the light receiving signal output from the optical pickup;

a second detecting circuit which detects a total reflected light amount from a second pit larger than the spot diameter of the laser light spot according to the light receiving signal output from the optical pickup; and a division circuit which divides the detection output of the first detecting means by the detection output of the second detecting means.

21. The optical information recording device according to claim 20, wherein the first pit is a pit having a minimum length used to record the information, and the second pit is a pit having a maximum length used to record the information.

22. An optical information recording device which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the device comprising:

an optical pickup which irradiates laser light to the optical information recording medium and receives reflected light from the optical information recording medium to output a light receiving signal;

laser control means which controls the recording power of the laser light output from the optical pickup;

servo-control means which controls a spatial positional relation of the laser light to the optical information recording medium;

information detecting means which detects, according to the light receiving signal output from the optical pickup, first information mainly depending on the recording power, second information depending on the recording power and the spatial positional relation and third information mainly depending on the spatial positional relation;

asymmetry detecting means which detects asymmetry of the light receiving signal according to the light receiving signal output from the optical pickup; and control means, wherein the control means comprises:

first recording control means which performs first recording to record test data on the optical information recording medium by sequentially changing the recording power of the laser light irradiated to the optical information recording medium by controlling the laser control means at the time of a recording laser light intensity optimization processing before information is actually recorded;

second recording control means which performs second recording to record test data on the optical information recording medium by sequentially changing a spatial positional relation of the laser light to the optical information recording medium with the recording power fixed by controlling the laser control means and the servo-control means;

first storing means which stores a first relation of the first information with the recording power, a second relation of the second information with the recording power and a relation of the recording power with the asymmetry by obtaining the first information and the second information according to the output of the information detecting means for every recording power at the first recording and obtaining asymmetry according to the output of the asymmetry detecting means;

second storing means which determines and stores optimum recording power with which optimum asymmetry can be obtained from the relation of the recording power with the asymmetry and stores optimum first information and optimum second information corresponding to the optimum recording power from the first relation and the second relation;

third storing means which store a relation of the third information with the asymmetry by obtaining the third information according to the output of the information detecting means at the time of the second recording and also obtaining asymmetry according to the output of the asymmetry detecting means;

fourth storing means which determines and stores a third relation of the third information with the recording power from the relation of the recording power with the asymmetry stored at the time of the first recording and the relation of the second information with the asymmetry stored at the time of the second recording and stores optimum third information corresponding to the optimum recording power from the third relation; and correcting means which detects the first information, the second information and the third information according to the output of the information detecting means at actual recording of the information, determines a first difference between the detected first information and the optimum first information, a second difference between the second information and the optimum second information and a third difference between the third information and the optimum third information, and when the third difference is zero and the first difference is not zero, determines a recording power according to the detected first information and the first relation, corrects the recording power so that the first difference becomes zero, and when the third difference is not zero and the first difference is zero, determines a recording power according to the detected third information and the third relation, corrects the recording power so that the third difference becomes zero, and when the third difference is not zero, the first difference is not zero and the second difference is not zero, determines a recording power according to the detected second information and the second relation, and corrects the recording power so that the second difference becomes zero.

23. The optical information recording device according to claim 22, wherein the servo-control means is provided with a focusing servo system, a tilting servo system and a tracking servo system of the optical pickup; and a sequential change in the spatial positional relation at the second recording is performed by changing at least one offset among the focusing servo system, the tilting servo system and the tracking servo system of the servo control means in predetermined steps.

24. The optical information recording device according to claim 22, wherein the second recording is performed with the recording power fixed to an optimum recording power determined from a relation of the recording power with the asymmetry.

25. The optical information recording device according to claim 22, wherein the first information is a differential light intensity value which is a difference between a maximum value of reflected light intensity at a front end and an average value of reflected light intensity at a rear end of a pit larger than the spot diameter of the laser light spot.

26. The optical information recording device according to claim 25, wherein the pit larger than the spot diameter of the laser light spot is a pit having a maximum length used to record the information.

27. The optical information recording device according to claim 22, wherein the second information is a difference detection value which is a difference between a differential light intensity value, which is a difference between the maximum value of reflected light intensity at a front end and an average value of reflected light intensity at a rear end of a pit larger than the spot diameter of the laser light spot, and a reflected light amount ratio, which is a ratio of a total reflected light amount from a pit smaller than the spot diameter to a total reflected light amount from a pit larger than the spot diameter.

28. The optical information recording device according to claim 27, wherein the pit larger than the spot diameter of the laser light spot is a pit having a maximum length used to record the information, and the pit smaller than the spot diameter of the laser light spot is a pit having a minimum length used to record the information.

29. The optical information recording device according to claim 22, wherein the third information is a reflected light amount ratio which is a ratio of a total reflected light amount from a pit smaller than the spot diameter to a total reflected light amount from a pit larger than the spot diameter.

30. The optical information recording device according to claim 29, wherein the pit larger than the spot diameter of the laser light spot is a pit having a maximum length used to record the information, and the pit smaller than the spot diameter of the laser light spot is a pit having a minimum length used to record the information.

31. An optical information recording device which irradiates a laser light spot having a predetermined diameter to an optical information recording medium according to a digital signal consisting of a first level indicating a pit forming period and a second level indicating a pit non-forming period to form a pit having a length corresponding to the pit forming period on the optical information recording medium, the device comprising:

an optical pickup which irradiates laser light to the optical information recording medium and receives reflected light from the optical information recording medium to output a light receiving signal;

laser control means which controls a recording power of the laser light output from the optical pickup;

servo-control means which controls at least one of focusing, tracking and tilting of the optical pickup;

differential light intensity value detecting means which detects a differential light intensity value which is a difference between a maximum value of the reflected light intensity at a front end and an average value of the reflected light intensity at a rear end of a pit larger than the spot diameter of the laser light spot;

reflected light amount ratio detecting means which detects as a reflected light amount ratio a ratio of a total reflected light amount from a pit smaller than the spot diameter to a total reflected light amount from a pit larger than the spot diameter of the laser light spot according to the light receiving signal output from the optical pickup;

asymmetry detecting means which detects asymmetry of the light receiving signal according to the light receiving signal output from the optical pickup; and control means, wherein the control means comprises:

first recording control means which records test data on the optical information recording medium by sequentially changing the recording power of the laser light irradiated to the optical information recording medium by controlling the laser control means at the time of a recording laser light intensity optimizing processing before actual recording of information;

first obtaining means which obtains, according to the recording power when recording by the first recording control means, the differential light intensity value from the differential light intensity value detecting means, the reflected light amount ratio from the reflected light amount ratio detecting means, and asymmetry as a difference detection value from the asymmetry detecting means, and calculates as a differential detection value a difference between the differential light intensity value and the reflected light amount ratio;

first processing means which determines to store a first detection expression indicating a relation between the recording power and the differential light intensity value according to the differential light intensity value obtained by the first obtaining means;

second processing means which determines to store a second detection expression indicating a relation between the recording power and the difference detection value according to the difference detection value calculated by the first obtaining means;

third processing means which determines to store a standard expression indicating a relation between the asymmetry and the recording power according to the asymmetry obtained by the first obtaining means;

fourth processing means which determines to store optimum recording power with which optimum asymmetry can be obtained according to the standard expression stored by the third processing means;

fifth processing means which stores as an optimum differential light intensity value a differential light intensity value corresponding to the optimum recording power according to the first detection expression and the optimum recording power determined by the fourth processing means;

sixth processing means which stores as an optimum standardized difference detection value the difference detection value corresponding to the optimum recording power according to the second detection expression and the optimum recording power determined by the fourth processing means;

second recording control means which controls the laser control means and the servo control means to fix the recording power to the optimum recording power determined by the fourth processing means and sequentially changes at least one servo based offset among focusing, tilting and tracking of the optical pickup for irradiating the laser light to the optical information recording medium in predetermined steps so to record test data on the optical information recording medium;

second obtaining means which obtains, when recording by the second recording control means, the reflected light amount ratio from the reflected light amount ratio detecting means for the every offset and also obtains asymmetry from the asymmetry detecting means;

seventh processing means which determines a relational expression of the reflected light amount ratio to the asymmetry according to the reflected light amount ratio and the asymmetry obtained by the second obtaining means;

eighth processing means which determines to store a third detection expression indicating a relation between the recording power and the reflected light amount ratio according to the relational expression determined by the seventh processing means and the standard expression determined by the third processing means;

ninth processing means which stores as an optimum reflected light amount ratio the reflected light amount ratio corresponding to the optimum recording power according to the optimum recording power determined by the fourth processing means and the third detection expression;

third obtaining means which, when actually recording information, obtains the differential light intensity value from the differential light intensity value detecting means, obtains the reflected light amount ratio from the reflected light amount ratio detecting means, and calculates a difference between the differential light intensity value and the reflected light amount ratio as a difference detection value;

tenth processing means which calculates a first difference between the optimum differential light intensity value and the differential light intensity value obtained by the third obtaining means;

eleventh processing means which calculates a second difference between the optimum standardized difference detection value and the difference detection value calculated by the third obtaining means;

twelfth processing means which calculates a third difference between the optimum reflected light amount ratio and the reflected light amount ratio obtained by the third obtaining means;

first correcting means which determines a recording power according to the first detection expression and the differential light intensity value obtained by the third obtaining means when the third difference is zero and the first difference is not zero, and corrects the recording power so that the first difference becomes zero;

second correcting means which determines a recording power according to the third detection expression and the reflected light amount ratio obtained by the third obtaining means when the third difference is not zero and the first difference is zero, and corrects the recording power so that the third difference becomes zero; and third correcting means which determines a recording power according to the second detection expression and the difference detection value calculated by the third obtaining means when the third difference is not zero, the first difference is not zero and the second difference is not zero, and corrects the recording power so that the second difference becomes zero.

32. The optical information recording device according to claim 31, wherein the first detection expression to the third detection expression each comprises a linear function.

33. The optical information recording device according to claim 31, wherein the differential light intensity value detecting means comprises:

a detecting circuit which detects a light receiving signal from a pit larger than the spot diameter of the laser light spot according to the light receiving signal output from the optical pickup;

a peak detecting circuit which detects a maximum value of the reflected light intensity at a front end of the pit larger than the spot diameter of the laser light spot according to the output of the detecting circuit;

a sample-and-hold circuit which determines an average value of the reflected light intensity at a rear end of the pit larger than the spot diameter of the laser light spot according to the output of the detecting circuit; and a subtraction circuit which determines a difference between the output of the peak detecting circuit and the output of the sample-and-hold circuit.

34. The optical information recording device according to claim 33, wherein the pit larger than the spot diameter of the laser light spot is a pit having a maximum length used to record the information.

35. The optical information recording device according to claim 31, wherein the reflected light amount ratio detecting means comprises:

a first detecting circuit which detects a total reflected light amount from a first pit smaller than the spot diameter of the laser light spot according to the light receiving signal output from the optical pickup;

second detecting means which detects a total reflected light amount from a second pit larger than the spot diameter of the laser light spot according to the light receiving signal output from the optical pickup; and a division circuit which divides the detection output of the first detecting means by the detection output of the second detecting means.

36. The optical information recording device according to claim 35, wherein the first pit is a pit having a minimum length used to record the information, and the second pit is a pit having a maximum length used to record the information.

37. A recording medium having recorded thereon an optical information recording control program to be processed by a computer which irradiates a laser light spot having a predetermined diameter to an optical information recording medium according to a digital signal comprising a first level indicating a pit forming period and a second level indicating a pit non-forming period to form a pit having a length corresponding to the pit forming period on the optical information recording medium, wherein the optical information recording control program:

before actual recording of information, sequentially changes a recording power of laser light to be irradiated to the optical information recording medium to record on the optical information recording medium and detects asymmetry for every recording power to determine a first relation between the asymmetry and the recording power;

fixes the recording power to a predetermined recording power and sequentially changes a spatial positional relation of the laser light to the optical information recording medium to record on the optical information recording medium, and detects a reflected light amount ratio related to the asymmetry and pits having a different length for the every spatial positional relation to determine a second relation between the asymmetry and the reflected light amount ratio;

determines a third relation between the recording power and the reflected light amount ratio according to the first relation and the second relation and determines an optimum reflected light amount ratio corresponding to an optimum recording power; and determines a recording power corresponding to the detected reflected light amount ratio according to the third relation by detecting the reflected light amount ratio at the time of actual recording of information, and corrects the recording power so that a difference between the detected reflected light amount ratio and the optimum reflected light amount ratio becomes zero.

38. A recording medium having recorded thereon an optical information recording control program which is processed by a computer to irradiate a laser light spot having a predetermined diameter to an optical information recording medium according to a digital signal comprising a first level indicating a pit forming period and a second level indicating a pit non-forming period to form a pit having a length corresponding to the pit forming period on the optical information recording medium, wherein the optical information recording control program:

performs first recording to record test data on the optical information recording medium by sequentially changing a recording power of the laser light irradiated to the optical information recording medium at the time of optimizing recording laser light intensity before actual recording of information;

performs second recording to record test data on the optical information recording medium by sequentially changing a spatial positional relation of the laser light to the optical information recording medium with the recording power fixed;

detects first information mainly depending on the recording power for the every recording power, second information depending on the recording power and the spatial positional relation and asymmetry at the time of the first recording, and stores a first relation of the first information with the recording power, a second relation of the second information with the recording power and a relation of the recording power with the asymmetry;

determines to store an optimum recording power enabling to obtain optimum asymmetry in view of the relation with the recording power to the asymmetry, and stores optimum first information and optimum second information corresponding to the optimum recording power in view of the first relation and the second relation;

detects third information mainly depending on the spatial positional relation and asymmetry at the time of the second recording, and stores a relation of the third information with the asymmetry;

determines to store a third relation of the third information with the recording power in view of the relation of the recording power with the asymmetry stored at the time of the first recording and the relation of the second information with the asymmetry stored at the time of the second recording, and stores optimum third information corresponding to the optimum recording power in view of the third relation;

detects the first information, the second information and the third information at the time of actual recording of information;

determines a first difference between the detected first information and the optimum first information, a second difference between the second information and the optimum second information and a third difference between the third information and the optimum third information;

determines a recording power according to the detected first information and the first relation when the third difference is zero and the first difference is not zero, and corrects the recording power so that the first difference becomes zero;

determines a recording power according to the detected third information and the third relation when the third difference is not zero and the first difference is zero, and corrects the recording power so that the third difference becomes zero; and determines a recording power according to the detected second information and the second relation when the third difference is not zero, the first difference is not zero and the second difference is not zero, and corrects the recording power so that the second difference becomes zero.

39. A recording medium having recorded thereon an optical information recording control program which is processed by a computer to irradiate a laser light spot having a predetermined diameter to an optical information recording medium according to a digital signal comprising a first level indicating a pit forming period and a second level indicating a pit non-forming period to form a pit having a length corresponding to the pit forming period on the optical information recording medium, wherein the optical information recording control program comprises:

a first step of recording test data on the optical information recording medium by sequentially changing a recording power of the laser light irradiated to the optical information recording medium at the time of optimizing recording laser light intensity before actual recording of information;

a second step of detecting in correspondence with the recording power, during the first step, a differential light intensity value which is a difference between a maximum value of reflected light intensity at a front end and an average value of reflected light intensity at a rear end of a pit larger than the spot diameter of the laser light spot, a reflected light amount ratio which is a ratio of a total reflected light amount from a pit smaller than the spot diameter to a total reflected light amount from the pit larger than the spot diameter and asymmetry, and calculating a difference between the differential light intensity value and the reflected light amount ratio as a difference detection value;

a third step of determining and storing a first detection expression which indicates a relation between the recording power and the differential light intensity value according to the differential light intensity value detected in the second step;

a fourth step of determining and storing a second detection expression which indicates a relation between the recording power and the difference detection value according to the difference detection value calculated in the second step;

a fifth step of determining and storing a standard expression which indicates a relation between the asymmetry and the recording power according to the asymmetry detected in the second step;

a sixth step of determining and storing an optimum recording power which can obtain optimum asymmetry according to the standard expression stored in the fifth step;

a seventh step of storing as an optimum differential light intensity value a differential light intensity value corresponding to the optimum recording power according to the optimum recording power determined in the sixth step and the first detection expression;

an eighth step of storing as an optimum standardized difference detection value a difference detection value corresponding to the optimum recording power according to the optimum recording power determined in the sixth step and the second detection expression;

a ninth step of recording test data on the optical information recording medium by sequentially changing at least one servo based offset among focusing, tilting and tracking of an optical pickup for irradiating the laser light to the optical information recording medium in a predetermined step with the recording power fixed to the optimum recording power determined in the sixth step;

a tenth step of detecting, during the ninth step, the reflected light amount ratio and asymmetry for every offset;

an eleventh step of determining a relational expression of a reflected light amount ratio to the asymmetry according to the reflected light amount ratio and asymmetry detected in the tenth step;

a twelfth step of determining and storing a third detection expression indicating a relation between the recording power and the reflected light amount ratio according to the relational expression determined in the eleventh step and the standard expression determined in the fifth step;

a thirteenth step of storing as an optimum reflected light amount ratio a reflected light amount ratio corresponding to the optimum recording power according to the optimum recording power determined in the sixth step and the third detection expression;

a fourteenth step of detecting the differential light intensity value and the reflected light amount ratio and to calculate a difference detection value when information is actually recorded;

a fifteenth step of calculating a first difference between the differential light intensity value detected in the fourteenth step and the optimum differential light intensity value;

a sixteenth step of calculating a second difference between the difference detection value calculated in the fourteenth step and the optimum standardized difference detection value;

a seventeenth step of calculating a third difference between the reflected light amount ratio detected in the fourteenth step and the optimum reflected light amount ratio;

an eighteenth step of determining a recording power according to the first detection expression and the differential light intensity value detected in the fourteenth step when the third difference is zero and the first difference is not zero and to correct the recording power so that the first difference becomes zero;

a nineteenth step of determining a recording power according to the third detection expression and the reflected light amount ratio detected in the fourteenth step when the third difference is not zero and the first difference is zero and to correct the recording power so that the third difference becomes zero; and a twentieth step of determining a recording power according to the second detection expression and the difference detection value calculated in the fourteenth step when the third difference is not zero, the first difference is not zero and the second difference is not zero and to correct the recording power so that the second difference becomes zero.

* * * * *

UNITED STATES PATENT AND TRADEMARK OFFICE
CERTIFICATE OF CORRECTION

| | | |
|---|---|---|
| PATENT NO. | : 7,050,367 B1 | Page 1 of 1 |
| APPLICATION NO. | : 09/719501 | |
| DATED | : May 23, 2006 | |
| INVENTOR(S) | : Akira Negishi et al. | |

It is certified that error appears in the above-identified patent and that said Letters Patent is hereby corrected as shown below:

In claim 22, column 31, line 31, please replace "store" with --stores--.

Signed and Sealed this

Twelfth Day of December, 2006

JON W. DUDAS
*Director of the United States Patent and Trademark Office*